United States Patent
Curtis et al.

(10) Patent No.: US 11,422,364 B2
(45) Date of Patent: Aug. 23, 2022

(54) EYEPIECE ARCHITECTURE INCORPORATING ARTIFACT MITIGATION

(71) Applicant: Magic Leap, Inc., Plantation, FL (US)

(72) Inventors: Kevin Richard Curtis, Boulder, CO (US); Samarth Bhargava, Palo Alto, CA (US); Bradley Jay Sissom, Boulder, CO (US); Victor Kai Liu, Mountain View, CA (US); Chulwoo Oh, Cedar Park, TX (US); Ravi Kumar Komanduri, Austin, TX (US); Kevin Messer, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 422 days.

(21) Appl. No.: 16/718,017

(22) Filed: Dec. 17, 2019

(65) Prior Publication Data

US 2020/0201026 A1     Jun. 25, 2020

Related U.S. Application Data

(60) Provisional application No. 62/784,013, filed on Dec. 21, 2018.

(51) Int. Cl.
G02B 27/00     (2006.01)
G02B 26/08     (2006.01)
(Continued)

(52) U.S. Cl.
CPC ..... *G02B 27/0093* (2013.01); *G02B 26/0808* (2013.01); *G02B 27/4205* (2013.01); *G06T 19/006* (2013.01)

(58) Field of Classification Search
CPC ............ G02B 26/0808; G02B 27/0093; G02B 27/4205; G02B 27/0172; G02B 27/0018; G06T 19/006
(Continued)

(56) References Cited

U.S. PATENT DOCUMENTS

| 9,069,115 B2 | 6/2015 | Gupta et al. |
| 2013/0208014 A1 | 8/2013 | Fleck et al. |

(Continued)

FOREIGN PATENT DOCUMENTS

| EP | 2837299 A1 | 2/2015 |
| WO | 2015109145 A1 | 7/2015 |
| WO | 2020131962 A1 | 6/2020 |

OTHER PUBLICATIONS

International Application No. PCT/US2019/066983, International Preliminary Report on Patentability dated Jul. 1, 2021, 7 pages.
(Continued)

*Primary Examiner* — Kristina M Deherrera
(74) *Attorney, Agent, or Firm* — Kilpatrick Townsend & Stockton LLP

(57) ABSTRACT

Techniques for artifact mitigation in an optical system are disclosed. Light associated with a world object is received at the optical system, which is characterized by a world side and a user side. Light associated with a virtual image is projected onto an eyepiece of the optical system, causing a portion of the light associated with the virtual image to propagate toward the user side and light associated with an artifact image to propagate toward the world side. A dimmer of the optical system positioned between the world side and the eyepiece is adjusted to reduce an intensity of the light associated with the artifact image impinging on the dimmer and an intensity of the light associated with the world object impinging on the dimmer.

20 Claims, 22 Drawing Sheets

(51) Int. Cl.
   *G02B 27/42*   (2006.01)
   *G06T 19/00*   (2011.01)
(58) Field of Classification Search
   USPC .......................................................... 359/290
   See application file for complete search history.

(56) References Cited

U.S. PATENT DOCUMENTS

2018/0052277 A1   2/2018   Schowengerdt et al.
2022/0050295 A1*  2/2022   Russell ................ G02B 27/283

OTHER PUBLICATIONS

International Application No. PCT/US2019/066983, International Search Report and Written Opinion dated Mar. 3, 2020, 8 pages.
Application No. EP19899592.0, Extended European Search Report, dated Jan. 14, 2022, 8 pages.

* cited by examiner

EYEPIECE ARCHITECTURE INCORPORATING ARTIFACT MITIGATION

CROSS-REFERENCES TO RELATED APPLICATIONS

This application claims the benefit of priority to U.S. Provisional Patent Application No. 62/784,013, filed Dec. 21, 2018, entitled "EYEPIECE ARCHITECTURE INCORPORATING ARTIFACT MITIGATION," the contents of which is herein incorporated in its entirety.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY OF THE INVENTION

The present disclosure relates generally to techniques for improving the performance and user experience of optical systems. More particularly, embodiments of the present disclosure provide methods for operating an augmented reality (AR) device comprising various adaptive lens assemblies, dynamic dimmers, and/or eyepieces. Although the present invention is described in reference to an AR device, the disclosure is applicable to a variety of applications in computer vision and image display systems.

In accordance with a first aspect of the present disclosure, a method of operating an optical system is provided. The method may include receiving light associated with a world object at the optical system, wherein the optical system is characterized by a world side and a user side opposing the world side. In some embodiments, the light associated with the world object is received from the world side. The method may also include, during one or more first time intervals, projecting light associated with a first virtual image onto a first eyepiece of the optical system, causing a portion of the light associated with the first virtual image to propagate toward the user side and light associated with a first artifact image to propagate toward the world side, and adjusting a first dimmer of the optical system positioned between the world side and the first eyepiece to reduce an intensity of the light associated with the first artifact image impinging on the first dimmer and an intensity of the light associated with the world object impinging on the first dimmer.

In some embodiments, the method further includes, during one or more second time intervals, projecting light associated with a second virtual image onto a second eyepiece of the optical system positioned between the world side and the first dimmer, causing a portion of the light associated with the second virtual image to propagate toward the user side and light associated with a second artifact image to propagate toward the world side, and adjusting the first dimmer to allow the light associated with the second virtual image impinging on the first dimmer to substantially pass through the first dimmer. In some embodiments, the method further includes, during the one or more first time intervals, adjusting a second dimmer of the optical system positioned between the world side and the second eyepiece to allow the light associated with the world object impinging on the second dimmer to substantially pass through the second dimmer, and, during the one or more second time intervals, adjusting the second dimmer to reduce an intensity of the light associated with the second artifact image impinging on the second dimmer and an intensity of the light associated with the world object impinging on the second dimmer.

In some embodiments, the one or more first time intervals at least partially overlap with the one or more second time intervals. In some embodiments, the one or more first time intervals are nonconcurrent with the one or more second time intervals. In some embodiments, the method further includes, during one or more third time intervals, adjusting the first dimmer to allow the light associated with the world object impinging on the first dimmer to substantially pass through the first dimmer, and adjusting the second dimmer to allow the light associated with the world object impinging on the second dimmer to substantially pass through the second dimmer. In some embodiments, the one or more third time intervals are nonconcurrent with both the one or more first time intervals and the one or more second time intervals. In some embodiments, the method further includes receiving, from an ambient light sensor, a brightness value of the light associated with the world object and determining a duration or a frequency of the one or more first time intervals based on the brightness value.

In accordance with a second aspect of the present disclosure, an optical system configured to receive light associated with a world object is provided. The optical system may include a first eyepiece. The optical system may also include a projector configured to project light associated with a first virtual image onto the first eyepiece during one or more first time intervals, causing a portion of the light associated with the first virtual image to propagate toward a user side and light associated with a first artifact image to propagate toward a world side. In some embodiments, the optical system is characterized by the world side and the user side opposing the world side. In some embodiments, the light associated with the world object is received from the world side. The optical system may further include a first dimmer positioned between the world side and the first eyepiece. In some embodiments, the first dimmer is configured to be adjusted to reduce an intensity of the light associated with the first artifact image impinging on the first dimmer and an intensity of the light associated with the world object impinging on the first dimmer.

In some embodiments, the optical system further includes a second eyepiece positioned between the world side and the first dimmer. In some embodiments, the projector is configured to project light associated with a second virtual image onto the second eyepiece during one or more second time intervals, causing the light associated with the second virtual image to propagate toward the user side and light associated with a second artifact image to propagate toward the world side. In some embodiments, the first dimmer is configured to allow the light associated with the second virtual image impinging on the first dimmer to substantially pass through the first dimmer during the one or more second time intervals. In some embodiments, the optical system further includes a second dimmer positioned between the world side and the second eyepiece. In some embodiments, the second dimmer is configured to be adjusted to allow the light associated with the world object impinging on the second dimmer to substantially pass through the second dimmer during the one or more first time intervals. In some embodiments, the second dimmer is configured to reduce an intensity of the light associated with the second artifact image impinging on the second dimmer and an intensity of the light associated with the world object impinging on the second dimmer during the one or more second time intervals.

In some embodiments, the one or more first time intervals at least partially overlap with the one or more second time intervals. In some embodiments, the one or more first time intervals are nonconcurrent with the one or more second time intervals. In some embodiments, the first dimmer is configured to be adjusted to allow the light associated with the world object impinging on the first dimmer to substantially pass through the first dimmer during one or more third time intervals, and the second dimmer is configured to be adjusted to allow the light associated with the world object impinging on the second dimmer to substantially pass through the second dimmer during the one or more third time intervals. In some embodiments, the one or more third time intervals are nonconcurrent with both the one or more first time intervals and the one or more second time intervals. In some embodiments, the optical system further includes an ambient light sensor configured to detect a brightness value of the light associated with the world object. In some embodiments, a duration or a frequency of the one or more first time intervals is based on the brightness value.

In accordance with a third aspect of the present disclosure, a non-transitory computer-readable medium is provided. The non-transitory computer-readable medium may include instructions that, when executed by a processor, cause the processor to perform operations including the method described in relation to the first aspect of the present disclosure.

Numerous benefits are achieved by way of the present disclosure over conventional techniques. For example, embodiments described herein reduce the amount of artifact image light that reaches the eye of the user while still efficiently projecting desired image light out of an eyepiece and to the user, which has been a significant limitation in optical systems. Other approaches to reduce artifact image light using anti-reflective coatings have been ineffective. Embodiments further make use of dynamic dimmers which have other uses, such as reducing the amount of world light reaching the eye of the user in bright, outdoor conditions. Some embodiments allow a significant reduction in artifact image light with a minimal or small effect on the world light and minimal or small effect to the desired image light. Other benefits of the present disclosure will be readily apparent to those skilled in the art.

DETAILED DESCRIPTION OF SPECIFIC EMBODIMENTS

Optical see through (OST) augmented reality (AR) devices can improve virtual content being presented to a user by applying optical power to the virtual image light (e.g., light associated with a virtual image) using one or more adaptive lens assemblies arranged within an optical stack. As optical stacks and eyepieces become more and more complex with additional layers, particularly those with a high index of refraction, ghost reflections (alternatively referred to herein as artifact images) due to portions of the virtual image light propagating toward a world side of the AR device and reflecting back toward the user become a serious problem. In some instances, an exit-pupil expander (EPE) and an orthogonal-pupil expander (OPE) regions of the eyepiece may cause unwanted reflections toward the world side and may launch image light toward the world side as well as toward the user. The use of anti-reflective coating may work for simple designs, however these coatings may be ineffective when optical power is applied to projected light. The problem is further exacerbated due to curved or tilted (due to, e.g., assembly tolerances) surfaces within the optical stack.

Embodiments of the present disclosure address these and other issues by providing one or more dynamic dimmers positioned within the optical stack to dim artifact image light (e.g., light stemming from undesired reflections of the projected light) passing therethrough. The dimmers may be time synchronized with the projector so as to only dim when certain waveguides receive/propagate light. In some embodiments, a single dynamic dimmer is positioned between two eyepieces corresponding to different depth planes. In some embodiments, two dynamic dimmers may be employed, each positioned on the world side of one of the two eyepieces.

Figure 1:
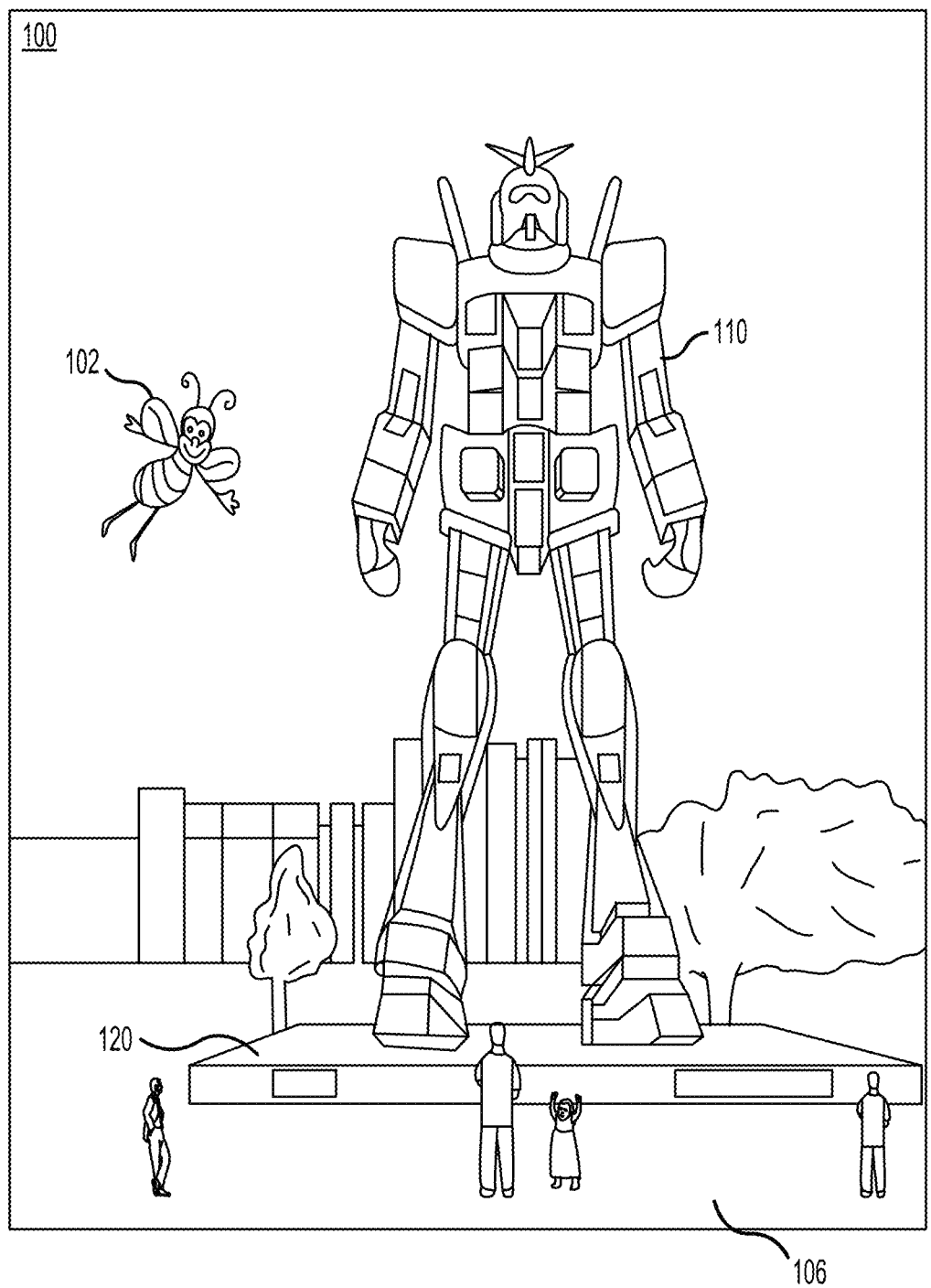
FIG. 1 illustrates an augmented reality (AR) scene as viewed through a wearable AR.

FIG. 1 illustrates an AR scene 100 as viewed through a wearable AR device, according to some embodiments. AR scene 100 is depicted wherein a user of an AR technology sees a real-world park-like setting 106 featuring people, trees, buildings in the background, and a real-world concrete platform 120. In addition to these items, the user of the AR technology also perceives that they "see" a robot statue 110 standing upon the real-world concrete platform 120, and a cartoon-like avatar character 102 flying by, which seems to be a personification of a bumble bee, even though these elements (character 102 and statue 110) do not exist in the real world. Due to the extreme complexity of the human visual perception and nervous system, it is challenging to produce a virtual reality (VR) or AR technology that facilitates a comfortable, natural-feeling, rich presentation of virtual image elements amongst other virtual or real-world imagery elements.

Figure 2A:
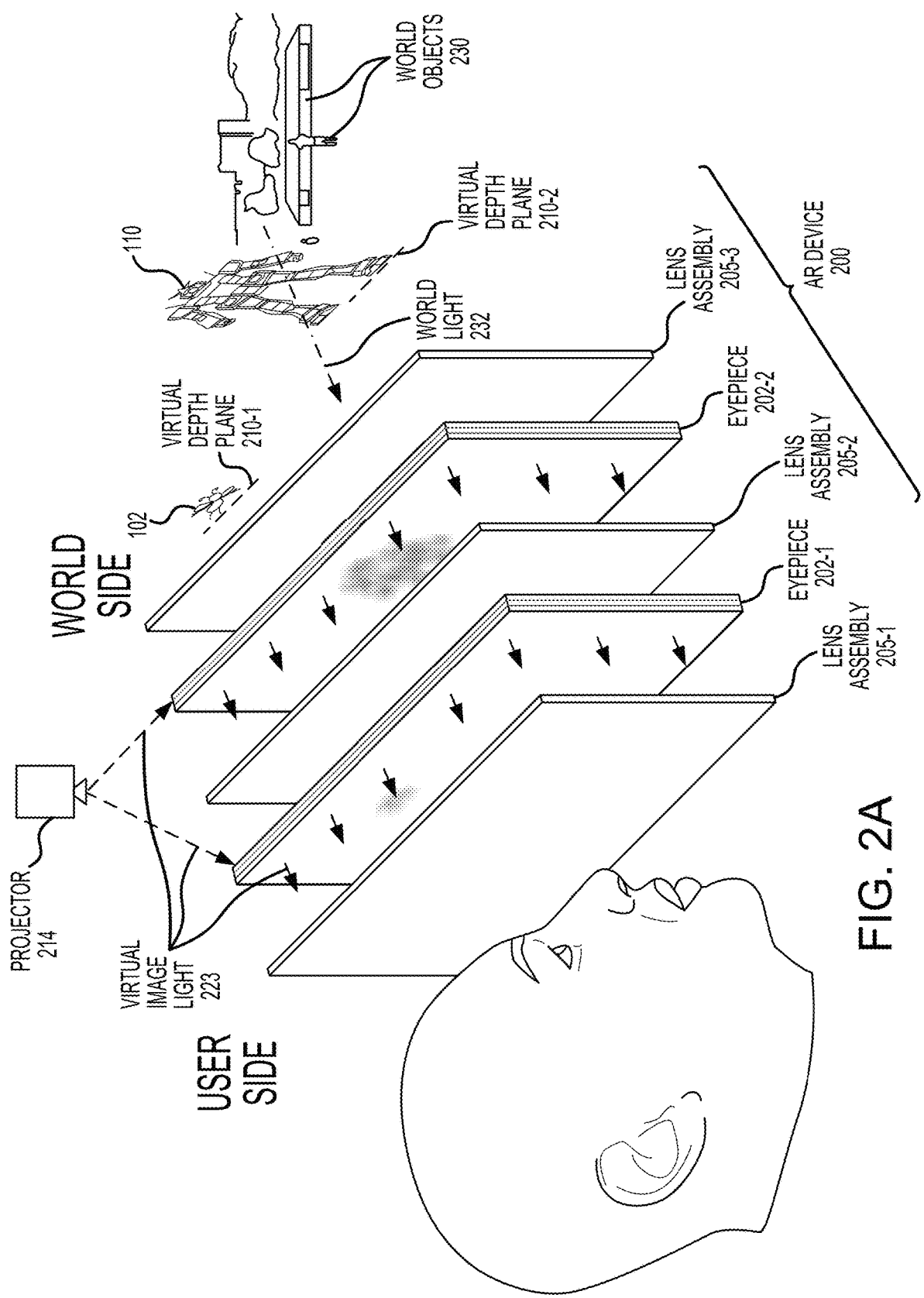
FIG. 2A illustrates an AR device operating under a first operating condition without artifact image light.

FIG. 2A illustrates an AR device 200 operating under a first operating condition without artifact image light, according to some embodiments. During operation, a projector 214 of AR device 200 may project virtual image light 223 (e.g., light associated with virtual content) onto a first eyepiece 202-1 and/or a second eyepiece 202-2, which may cause a light field (e.g., an angular representation of virtual content) to be projected onto a retina of a user in a manner such that the user perceives the corresponding virtual content as being positioned at some location within an environment of the user. For example, virtual image light 223 outcoupled by first eyepiece 202-1 may cause the user may perceive character 102 as being positioned at a first virtual depth plane 210-1, and virtual image light 223 outcoupled by second eyepiece 202-2 may cause the user may perceive statue 110 as being positioned at a second virtual depth plane 210-2. The user perceives the virtual content along with world light 232 corresponding to one or more world objects 230, such as platform 120.

In some embodiments, AR device 200 may include a first adaptive lens assembly 205-1 positioned on the user side of first eyepiece 202-1 (the side of first eyepiece 202-1 closest to the eye of the user), a second adaptive lens assembly 205-2 positioned on the world side of first eyepiece 202-1 and on the user side of second eyepiece 202-2 (e.g., between eyepieces 202-1, 202-2), and a third adaptive lens assembly 205-3 positioned on the world side of second eyepiece 202-2. Each of lens assemblies 205-1, 205-2, 205-3 may be configured to apply optical power to the light passing therethrough. In some embodiments, third lens assembly 205-3 is configured to apply optical power opposite of lens assemblies 205-1, 205-2 to world light 232 passing therethrough so as to prevent distortion caused by the optical power applied by lens assemblies 205-1, 205-2.

Figure 2B:
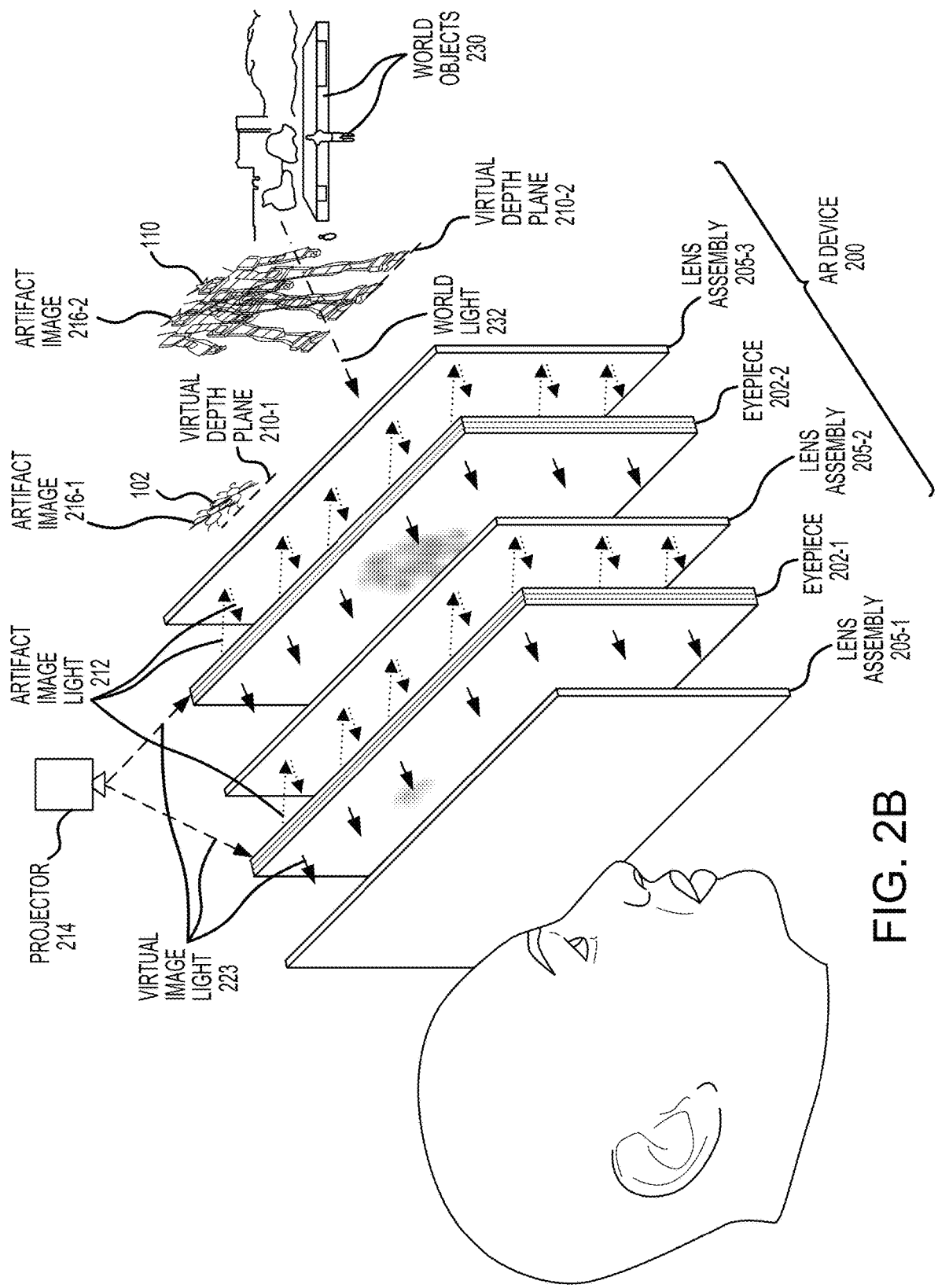
FIG. 2B illustrates an AR device operating under a second operating condition with artifact image light.

FIG. 2B illustrates AR device 200 operating under a second operating condition in which artifact image light 212 is first emitted from eyepieces 202-1, 202-2 toward the world side and is reflected toward the user side, causing artifact image light 212 to be projected onto the user's retina in a manner such that the user perceives the corresponding virtual content as being positioned at some location within the user's environment. For example, artifact image light 212 emitted toward the world side from first eyepiece 202-1 may cause the user to perceive a first artifact image 216-1 as being positioned at or near first virtual depth plane 210-1, and artifact image light 212 emitted from second eyepiece 202-2 may cause the user may perceive a second artifact image 216-2 as being positioned at or near second virtual depth plane 210-2. In some embodiments, first artifact image 216-1 may be positioned near second virtual depth plane 210-2 and/or second artifact image 216-2 may be positioned near first virtual depth plane 210-1. First artifact image 216-1 may be similar in appearance to character 102 and second artifact image 216-2 may be similar in appearance to statue 110. In addition to the light emitted toward the world and reflecting back to the user, the light emitted toward the user can be reflected twice and come back to the user as artifact image light. This is caused by two reflections and may therefore be less significant than the light that is emitted toward the world side and reflected back toward the user as this includes a single reflection and is likely much stronger than any two or more reflected artifact light. In some instances, an eyepiece may emit as much or nearly as much light toward the world side as it does toward the user side. In some embodiments, additional artifact images may be perceived by the user depending on the number of different possible reflections of virtual image light 223 within the optical stack.

Figure 2C:
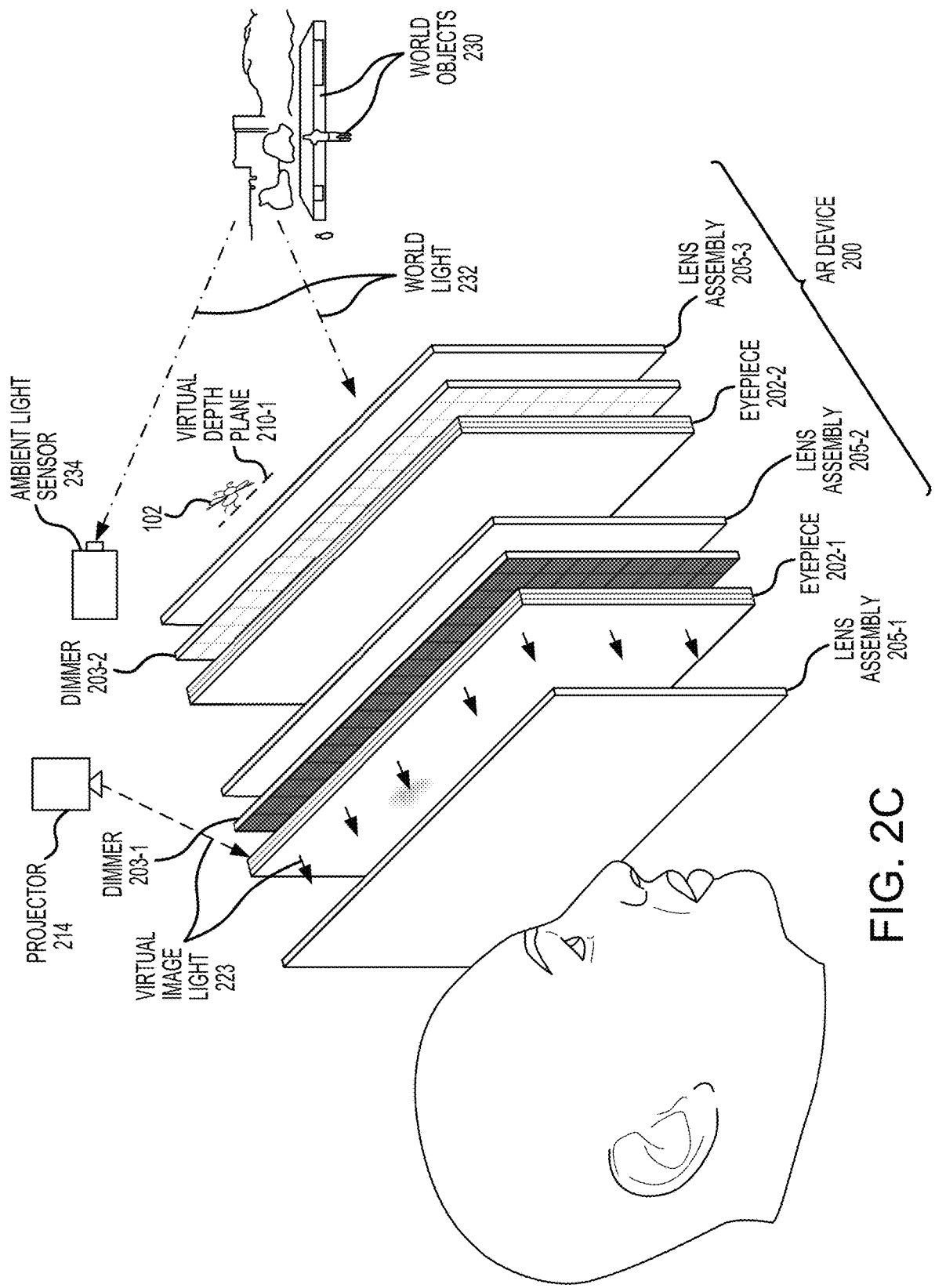
FIGS. 2C and 2D illustrate an AR device including a first dimmer and a second dimmer.
Figure 2D:
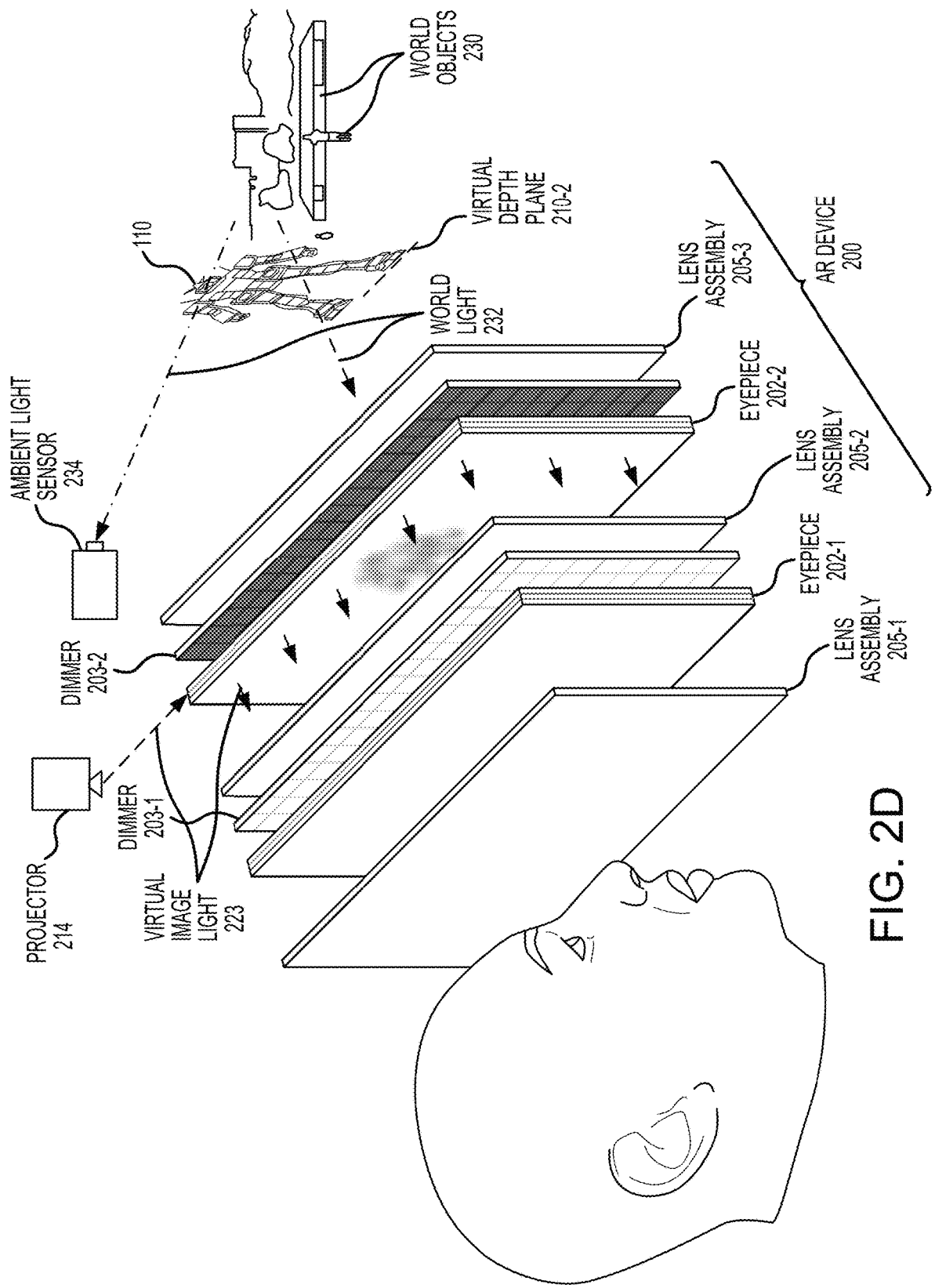

FIGS. 2C and 2D illustrate AR device 200 including a first dimmer 203-1 and a second dimmer 203-2, according to some embodiments. First dimmer 203-1 may be positioned on the world side of first eyepiece 202-1 and on the user side of second lens assembly 205-2 (e.g., between first eyepiece 202-1 and second lens assembly 205-2) and second dimmer 203-2 may be positioned on the world side of second eyepiece 202-2 and on the user side of third lens assembly 205-3 (e.g., between second eyepiece 202-2 and third lens assembly 205-3). In reference to FIG. 2C, during a first time interval, projector 214 may project virtual image light 223 onto first eyepiece 202-1. Also during the first time interval, first dimmer 203-1 may be adjusted so as to reduce the light passing therethrough, which may include reducing an intensity of artifact image light 212 propagating from first eyepiece 202-1 toward the world side and/or an intensity of world light 232 propagating toward the user side and impinging on first dimmer 203-1.

In reference to FIG. 2D, during a second time interval, projector 214 may project virtual image light 223 onto second eyepiece 202-2. Also during the second time interval, second dimmer 203-2 may be adjusted so as to reduce the light passing therethrough, which may include reducing an intensity of artifact image light 212 propagating from second eyepiece 202-2 toward the world side and/or an intensity of world light 232 propagating toward the user side and impinging on second dimmer 203-2. In some embodiments, second dimmer 203-2 may also reduce artifact image light 212 propagating from first eyepiece 202-1 when second dimmer 203-2 and first eyepiece 202-1 are both activated. As used herein, a dimming element may be considered to be "activated" when the functionality of the dimmer is being implemented, e.g., when an intensity of light passing therethrough is being reduced. As used herein, an eyepiece may be considered to be "activated" when virtual image light 223 is being projected onto the eyepiece, e.g., onto any one or more of the waveguides of the eyepiece.

In some embodiments, AR device 200 may cycle between operating within the first time interval and the second time interval such that eyepieces 202-1, 202-2 are being activated at different times. For example, AR device 200 may cycle between operating within the first time interval and operating within the second time interval at 10 Hz, 100 Hz, 1 kHz, or any frequencies therebetween. Accordingly, one or more first time intervals may be partially overlapping (e.g., concurrently), completely overlapping (e.g., simultaneously), or completely non-overlapping (e.g., nonconcurrently) with one or more second time intervals. AR device 200 may dynamically adjust the durations of the first and second time intervals based on several factors including, but not limited to, the brightness of the virtual content, the brightness of virtual image light 223, the brightness of world light 232, a user-specified brightness for the virtual content, a user-specified brightness for world light 232, a software-specified brightness for the virtual content, a software-specified brightness for world light 232, among other possibilities. In addition, each depth plane can stay on indefinitely and/or independently. AR device 200 may change between depth planes/eyepieces depending on what depth content is to be displayed at and/or where the user is looking, for example, as determined by an eye tracking system.

As used herein, one or more first time intervals are considered to be nonconcurrent with one or more second time intervals when none of the time intervals of the one or more first time intervals overlap with any of the time intervals of the one or more second time intervals. According to one example, one or more first time intervals including the following time intervals: 0 ms to 10 ms, 20 ms to 30 ms, 40 ms to 50 ms, 60 ms to 70 ms, and 80 ms to 90 ms, are considered to be nonconcurrent with one or more second time intervals including the following time intervals: 10 ms to 20 ms, 30 ms to 40 ms, 50 ms to 60 ms, 70 ms to 80 ms, and 90 ms to 100 ms. According to another example, one or more first time intervals including the following time intervals: 0 ms to 10 ms, 40 ms to 50 ms, and 80 ms to 90 ms, are considered to be nonconcurrent with one or more second time intervals including the following time intervals: 20 ms to 30 ms and 60 ms to 70 ms.

In some embodiments, AR device 200 may include an ambient light sensor 234 configured to detect world light 232. Ambient light sensor 234 may be positioned such that world light 232 detected by ambient light sensor 234 is similar to and/or representative of world light 232 that impinges on AR device 200. In some embodiments, ambient light sensor 234 may be configured to detect one or more spatially-resolved light values corresponding to different pixels of a camera of AR device 200. In some embodiments, ambient light sensor 234 may be configured to detect a global light value corresponding to an average light intensity or a single light intensity of world light 232. Detected ambient light may be used by AR device 200 to determine a time averaged transmission state of first and second dimmers 203-1, 203-2. For example, the detected ambient light may be used to determine a switching frequency between the first and second time intervals and/or the amount of transmission of first and second dimmers 203-1, 203-2.

Figure 3:
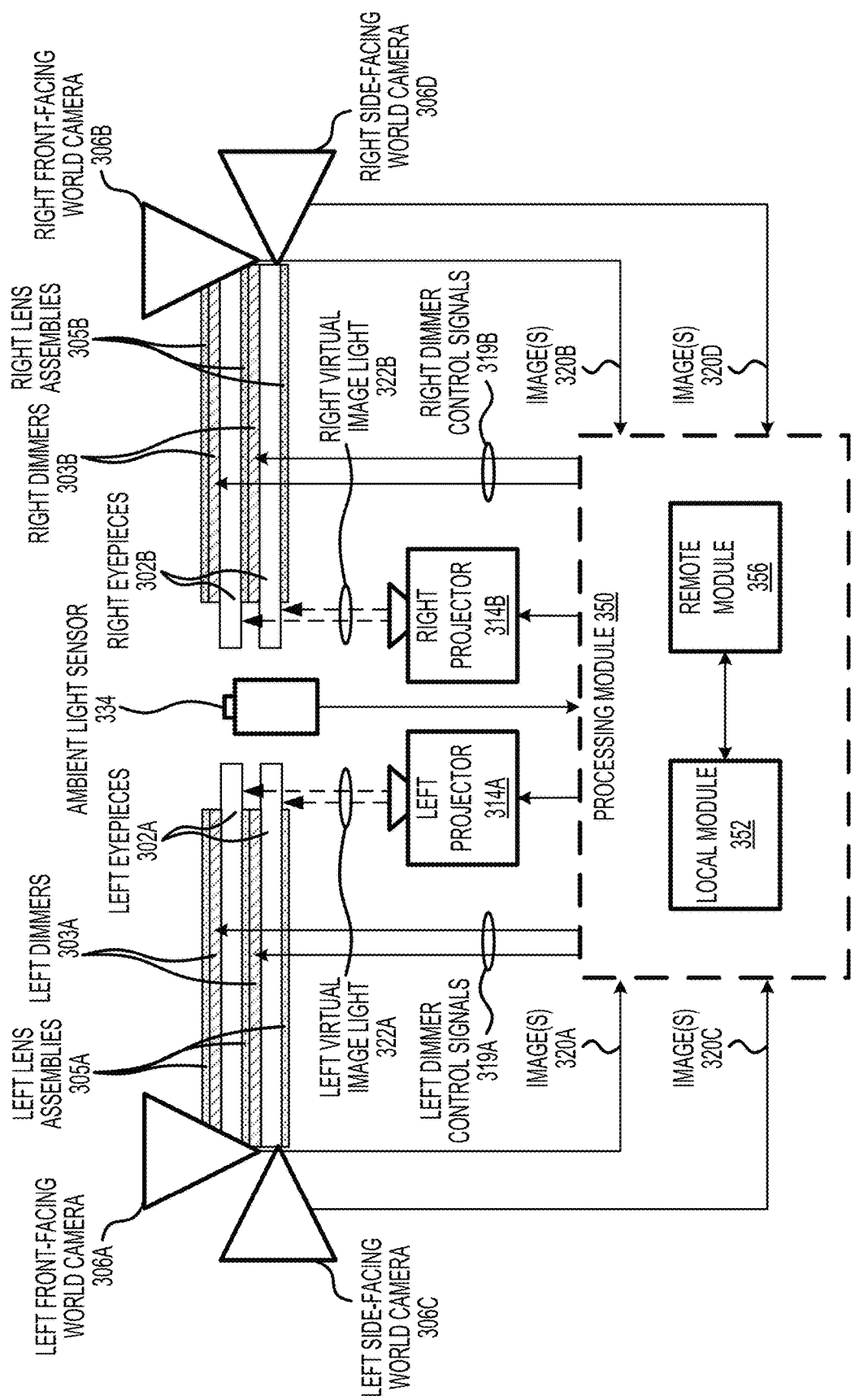
FIG. 3 illustrates a schematic view of a wearable AR device.

FIG. 3 illustrates a schematic view of a wearable AR device 300, according to some embodiments. AR device 300 may include left eyepieces 302A, left dimmers 303A, and left lens assemblies 305A arranged in a side-by-side configuration and right eyepieces 302B, right dimmers 303B, and right lens assemblies 305B also arranged in a side-by-side configuration. In some embodiments, AR device 300 includes one or more sensors including, but not limited to: a left front-facing world camera 306A attached directly to or near left eyepieces 302A, a right front-facing world camera 306B attached directly to or near right eyepieces 302B, a left side-facing world camera 306C attached directly to or near left eyepieces 302A, a right side-facing world camera 306D attached directly to or near right eyepieces 302B, a left eye tracker positioned so as to observe a left eye of a user, a right eye tracker positioned so as to observe a right eye of a user, and an ambient light sensor 334. In some embodiments, AR device 300 includes one or more image projection devices such as a left projector 314A optically linked to left eyepieces 302A and a right projector 314B optically linked to right eyepieces 302B.

Some or all of the components of AR device 300 may be head mounted such that projected images may be viewed by a user. In some embodiments, all of the components of AR device 300 shown in FIG. 3 are mounted onto a single device (e.g., a single headset) wearable by a user. In some embodiments, one or more components of a processing module 350 are physically separate from and communicatively coupled to the other components of AR device 300 by one or more wired and/or wireless connections. For example, processing module 350 may include a local module 352 on the head mounted portion of AR device 300 and a remote module 356 physically separate from and communicatively linked to local module 352. Remote module 356 may be mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Processing module 350 may include a processor and an associated digital memory, such as non-volatile memory (e.g., flash memory), both of which may be utilized to assist in the processing, caching, and storage of data. The data may include data captured from sensors (which may be, for example, operatively coupled to AR device 300) or otherwise attached to a user, such as cameras 306, ambient light sensor 334, eye trackers, microphones, inertial measurement units, accelerometers, compasses, GPS units, radio devices, and/or gyros. For example, processing module 350 may receive image(s) 320 from cameras 306. Specifically, processing module 350 may receive left front image(s) 320A from left front-facing world camera 306A, right front image(s) 320B from right front-facing world camera 306B, left side image(s) 320C from left side-facing world camera 306C, and right side image(s) 320D from right side-facing world camera 306D. In some embodiments, image(s) 320 may include a single image, a pair of images, a video including a stream of images, a video including a stream of paired images, and the like. Image(s) 320 may be periodically generated and sent to processing module 350 while AR device 300 is powered on, or may be generated in response to an instruction sent by processing module 350 to one or more of cameras 306. In some embodiments, processing module 350 may receive ambient light information from ambient light sensor 334. In some embodiments, processing module 350 may receive gaze information from the eye trackers. In some embodiments, processing module 350 may receive image information (e.g., image brightness values) from one or both of projectors 314.

Eyepieces 302A, 302B may include transparent or semi-transparent waveguides configured to direct and outcouple light from projectors 314A, 314B, respectively. Specifically, processing module 350 may cause left projector 314A to output left virtual image light 322A onto left eyepieces 302A, and may cause right projector 314B to output right virtual image light 322B onto right eyepieces 302B. In some embodiments, each of eyepieces 302 may include one or more waveguides corresponding to different colors and/or different depth planes. In some embodiments, dimmers 303 may be coupled to and/or integrated with eyepieces 302. For example, dimmers 303 may be incorporated into a multi-layer eyepiece and may form one or more layers that make up one of eyepieces 302. In some embodiments, processing module 350 may electrically activate dimmers 303A, 303B using left dimmer control signals 319A and right dimmer control signals 319B, respectively.

Cameras 306A, 306B may be positioned to capture images that substantially overlap with the field of view of a user's left and right eyes, respectively. Accordingly, placement of cameras 306 may be near a user's eyes but not so near as to obscure the user's field of view. Alternatively or additionally, cameras 306A, 306B may be positioned so as to align with the incoupling locations of virtual image light 322A, 322B, respectively. Cameras 306C, 306D may be positioned to capture images to the side of a user, for example, in a user's peripheral vision or outside the user's peripheral vision. Image(s) 320C, 320D captured using cameras 306C, 306D need not necessarily overlap with image(s) 320A, 320B captured using cameras 306A, 306B.

Figure 4A:
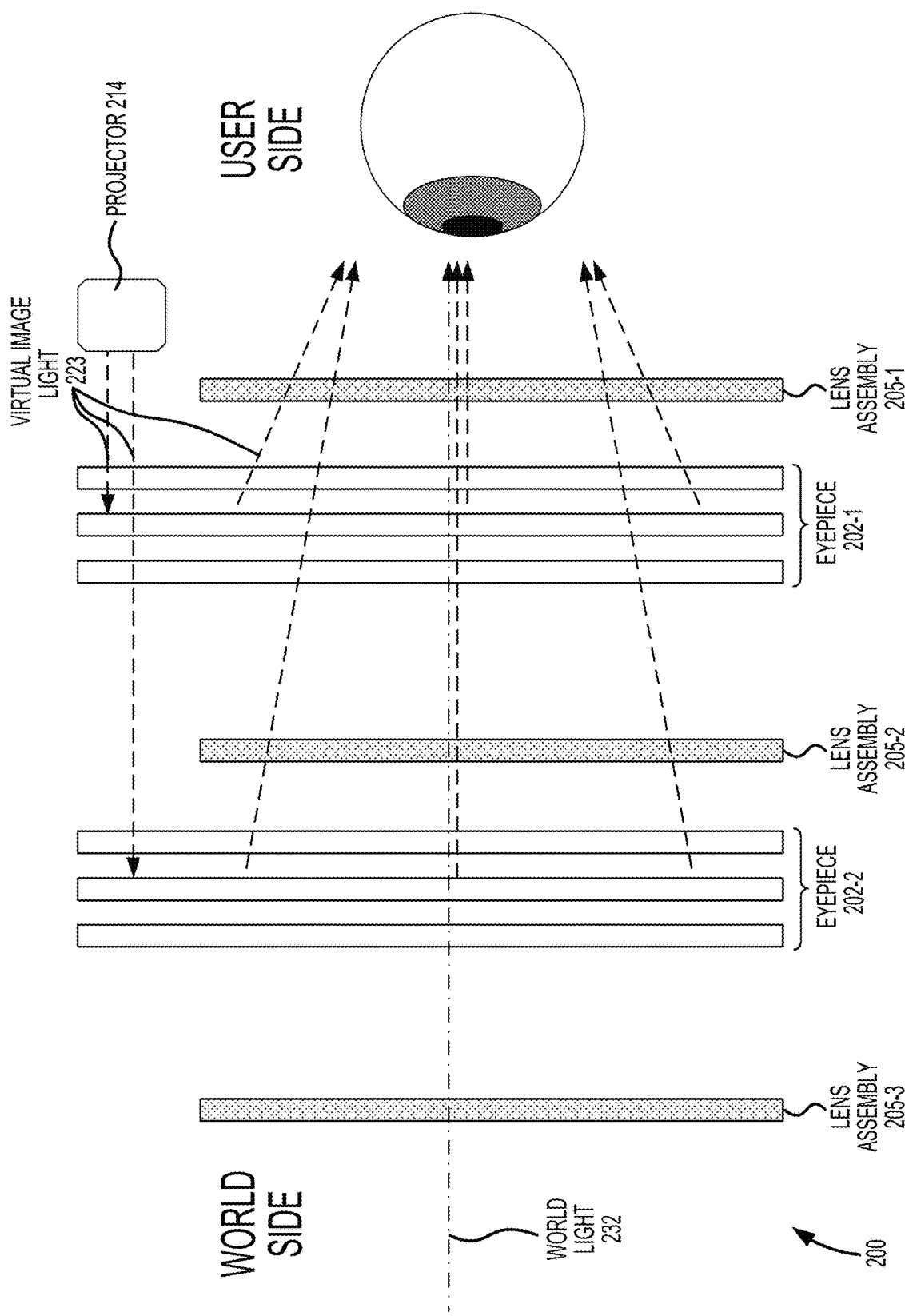
FIG. 4A illustrates an AR device operating under a first operating condition without artifact image light.

FIG. 4A illustrates AR device 200 operating under a first operating condition without artifact image light, according to some embodiments. FIG. 4A may correspond to the same scenario illustrated in FIG. 2A. During operation, projector 214 projects virtual image light 223 onto one or more waveguides of first eyepiece 202-1 and/or one or more waveguides of second eyepiece 202-2, which may cause a light field to be projected onto the user's retina in a manner such that the user perceives the corresponding virtual content as being positioned at some location within the user's environment. The user perceives the virtual content along with world light 232 corresponding to one or more world objects 230. In some embodiments, AR device 200 may include first adaptive lens assembly 205-1 positioned on the user side of first eyepiece 202-1, second adaptive lens assembly 205-2 positioned on the world side first eyepiece 202-1 and on the user side of second eyepiece 202-2, and third adaptive lens assembly 205-3 positioned on the world side of second eyepiece 202-2.

Figure 4B:
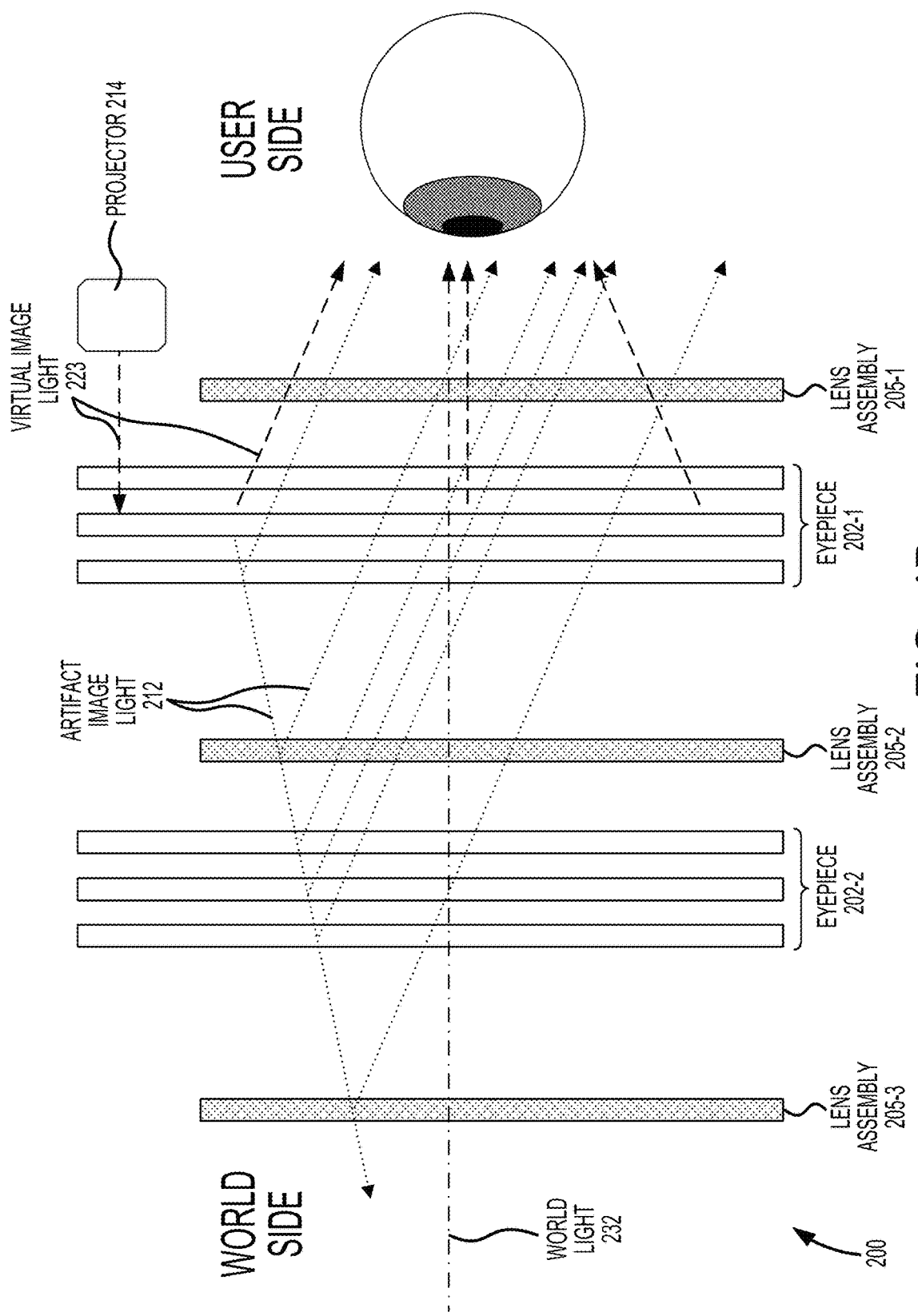
FIG. 4B illustrates an AR device operating under a second operating condition with artifact image light.

FIG. 4B illustrates AR device 200 operating under a second operating condition in which light is first emitted from first eyepiece 202-1 toward the world and user sides and the world side light is reflected toward the user side, causing artifact image light 212 to be projected onto the user's retina in a manner such that the user perceives one or more artifact images 216 as being positioned at some location within the user's environment. In the illustrated embodiment, virtual image light 223 is projected onto a waveguide (e.g., a second waveguide) of first eyepiece 202-1 causing light to emit from the second waveguide of first eyepiece 202-1 toward the world side and user sides. Artifact image light 212 subsequently reflects off of various surfaces on the world side of the second waveguide of first eyepiece 202-1 toward the user side, the surfaces including a third waveguide of first eyepiece 202-1, second lens assembly 205-2, each of the waveguides of second eyepiece 202-2, and third lens assembly 205-3. Each reflection may cause the user to perceive an additional artifact image 216.

In some embodiments, the user may perceive additional artifact images 216 based on more than one or two reflections (e.g., three or more reflections). For example, the user may perceive an artifact image 216 based on light emitted from the second waveguide of first eyepiece 202-1 toward the world side, reflecting off of a third waveguide of first eyepiece 202-1 toward the user side, reflecting off of first lens assembly 205-1 toward the world side, and reflecting off of the first waveguide of first eyepiece 202-1 toward the user side. Such images are typically weaker (e.g., in terms of brightness, contrast, etc.) and pose much less of a problem in comparison to artifact images 216 based on single or double reflected light. Even high quality AR coatings may be insufficient to mitigate the artifact image light as the many surfaces off of which reflections occur may make the artifact image light stronger. Furthermore, if the assembly includes powered elements such as lens assemblies 205-1, 205-2, 205-3, these can spatially concentrate the artifact image light and make it more noticeable to the user.

Figure 4C:
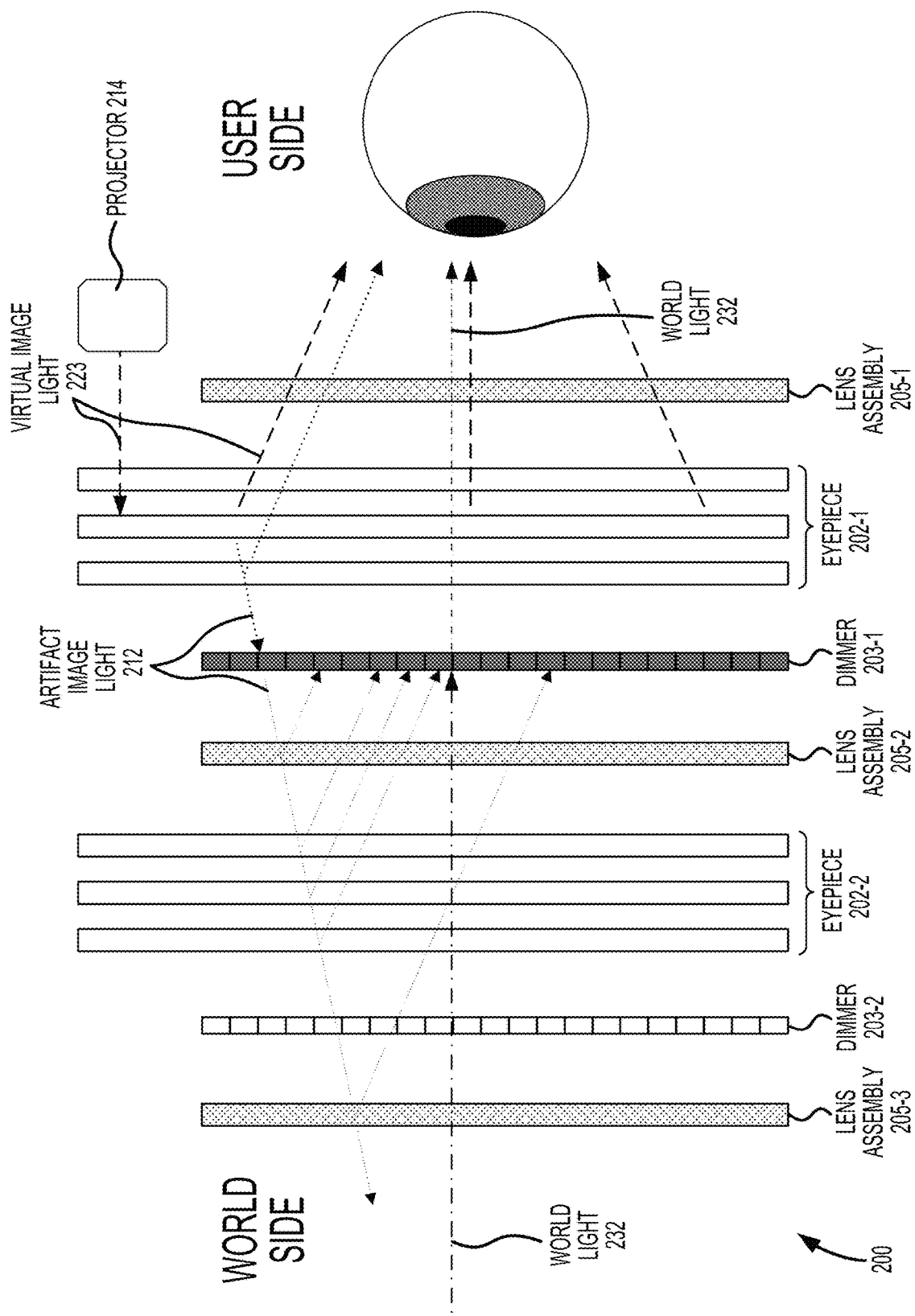
FIG. 4C illustrates an AR device including dimmers.

FIG. 4C illustrates AR device 200 including dimmers 203-1, 203-2, according to some embodiments. In the illustrated embodiment, first dimmer 203-1 is positioned on the world side of first eyepiece 202-1 and on the user side of second lens assembly 205-2 and second dimmer 203-2 is positioned on the world side of second eyepiece 202-2 and on the user side of third lens assembly 205-3. During a first time interval, projector 214 may project virtual image light 223 onto the second waveguide of first eyepiece 202-1. Also during the first time interval, first dimmer 203-1 is adjusted to, for example, partially but not completely dim artifact image light 212 passing therethrough, causing a portion of artifact image light 212 to continue to propagate toward the world side, to reflect off various surfaces on the world side of first dimmer 203-1, and to pass through first dimmer 203-1 a second time. Because first dimmer 203-1 is adjusted to only partially dim light passing therethrough, a portion of world light 232 impinging on first dimmer 203-1 is able to pass through first dimmer 203-1 and reach the eye of the user. Such embodiments may be effective to significantly reduce artifact image light 212 reaching the eye of the user while simultaneously allowing a portion of world light 232 to reach the eye of the user. In some embodiments, the undesired artifact image light 212 has to pass through first dimmer 203-1 twice which doubles the losses artifact image light 212 sees. First dimmer 203-1 may be a single spatially uniform dimming of light or it may be spatially varying transmission.

Figure 4D:
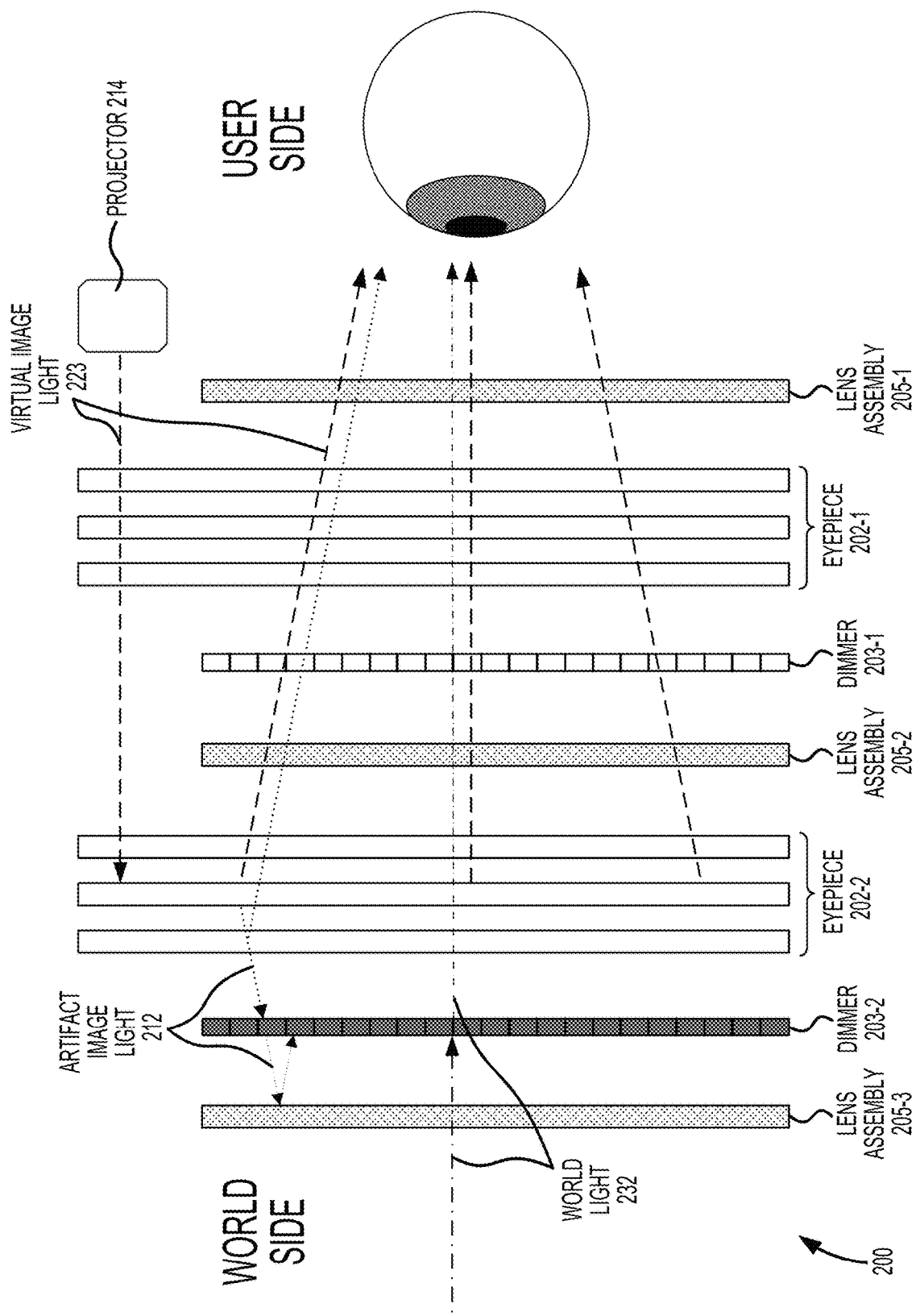
FIG. 4D illustrates an AR device including dimmers.

FIG. 4D illustrates AR device 200 including dimmers 203-1, 203-2 according to some embodiments. During a second time interval, projector 214 may project virtual image light 223 onto a waveguide (e.g., a second waveguide) of second eyepiece 202-2. Also during the second time interval, second dimmer 203-2 is adjusted to, for example, partially but not completely dim artifact image light 212 passing therethrough, causing a portion of artifact image light 212 to continue to propagate toward the world side, to reflect off various surfaces on the world side of second dimmer 203-2, and to pass through second dimmer 203-2 a second time. Because second dimmer 203-2 is adjusted to only partially dim light passing therethrough, a portion of world light 232 impinging on second dimmer 203-2 is able to pass through second dimmer 203-2 and reach the eye of the user. Such embodiments may be effective to significantly reduce artifact image light 212 reaching the eye of the user while simultaneously allowing a portion of world light 232 to reach the eye of the user. In some embodiments, the undesired artifact image light 212 has to pass through a second dimmer 203-2 twice which doubles the loss artifact image light 212 sees. Second dimmer 203-2 may be a single spatially uniform dimming of light or it may be spatially varying transmission.

Figure 5A:
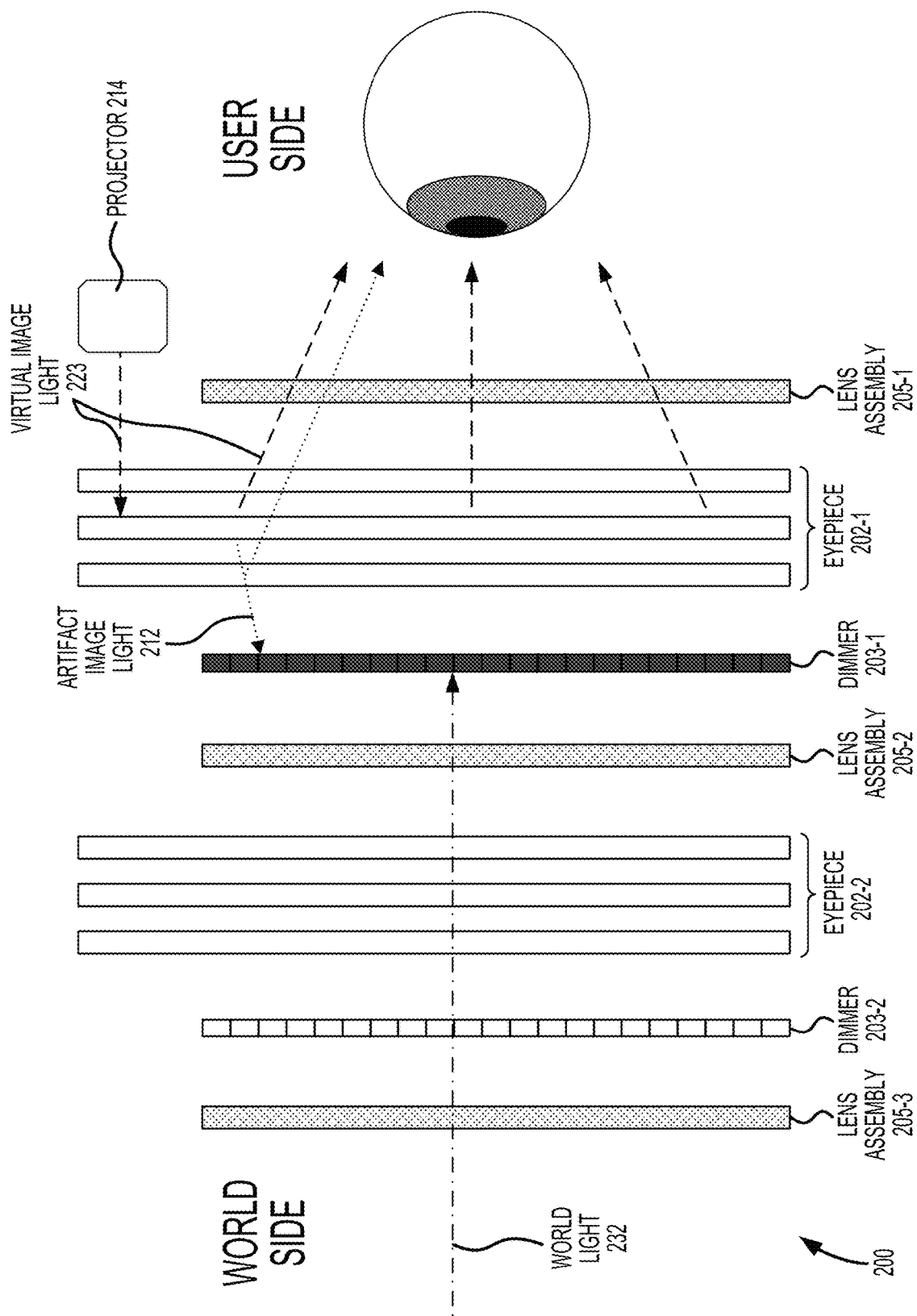
FIG. 5A illustrates an AR device including dimmers.

FIG. 5A illustrates AR device 200 including dimmers 203-1, 203-2 according to some embodiments. During a first time interval, projector 214 may project virtual image light 223 onto a waveguide (e.g., the second waveguide) of first eyepiece 202-1. Also during the first time interval, first dimmer 203-1 is adjusted to completely or substantially dim artifact image light 212 passing therethrough, causing artifact image light 212 impinging on first dimmer 203-1 to be blocked. Because first dimmer 203-1 is adjusted to completely or substantially dim artifact image light 212 passing therethrough, world light 232 impinging on first dimmer 203-1 may be blocked and prevented from reaching the eye of the user.

Figure 5B:
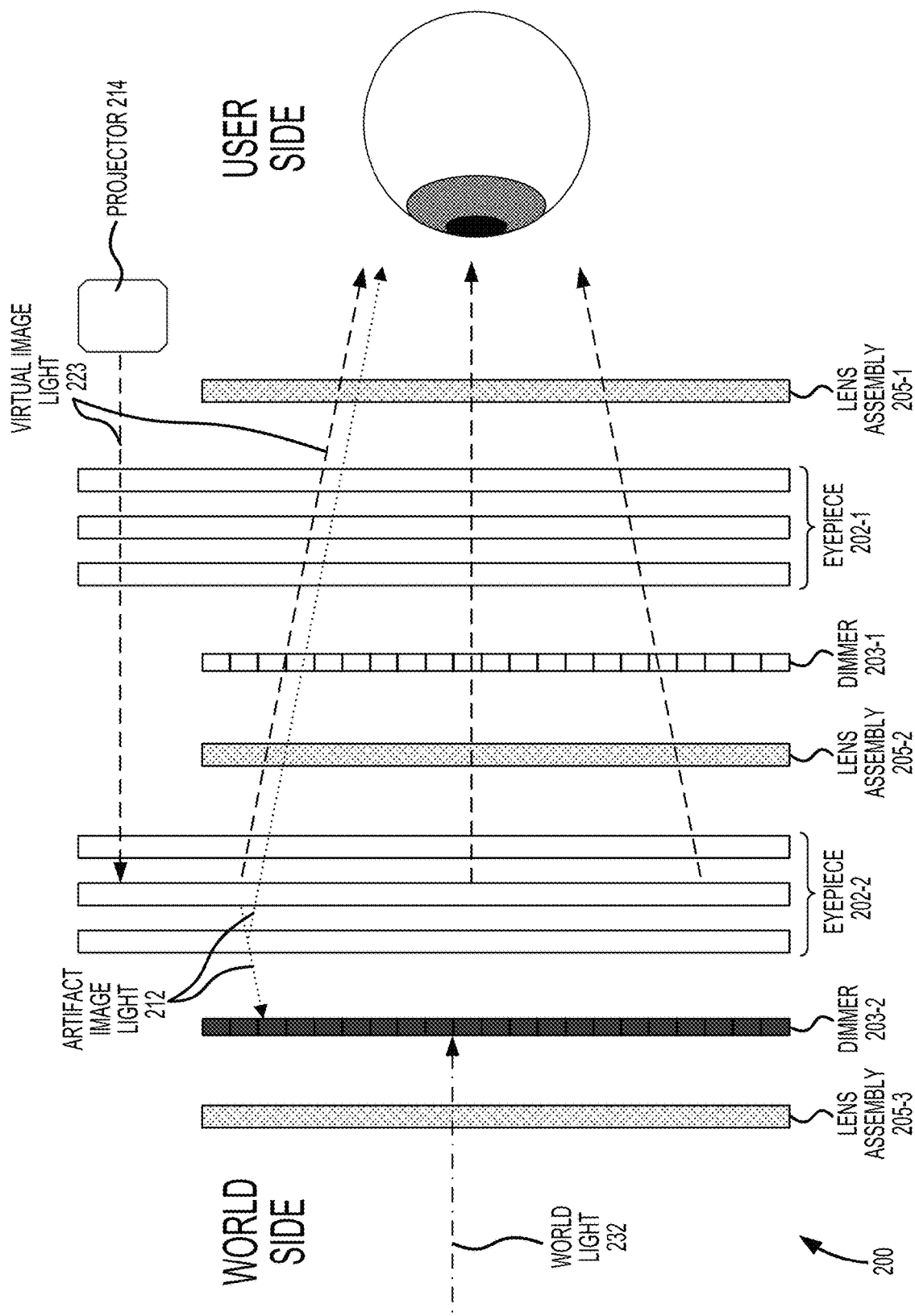
FIG. 5B illustrates an AR device including dimmers.

FIG. 5B illustrates AR device 200 including dimmers 203-1, 203-2 according to some embodiments. During a second time interval, projector 214 may project virtual image light 223 onto a waveguide (e.g., the second waveguide) of second eyepiece 202-2. Also during the second time interval, second dimmer 203-2 is adjusted to completely or substantially dim artifact image light 212 passing therethrough, causing artifact image light 212 impinging on second dimmer 203-2 to be blocked. Because second dimmer 203-2 is adjusted to completely or substantially dim artifact image light 212 passing therethrough, world light 232 impinging on second dimmer 203-2 may be blocked and prevented from reaching the eye of the user.

Figure 5C:
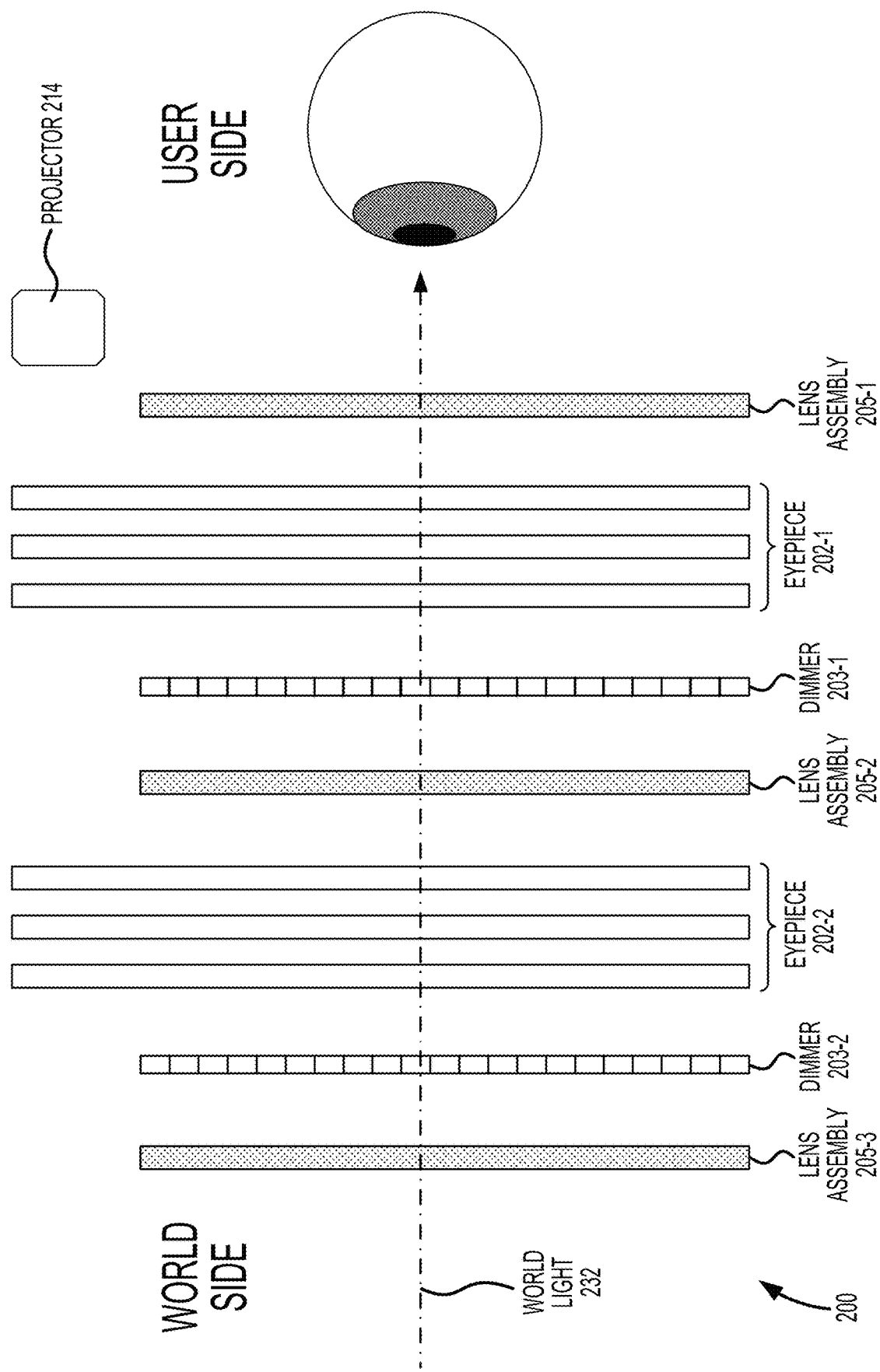
FIG. 5C illustrates an AR device including dimmers.

FIG. 5C illustrates AR device 200 including dimmers 203-1, 203-2 according to some embodiments. During a third time interval, projector 214 may be turned off or configured to not project onto either of eyepieces 202-1, 202-2. Also during the third time interval, first dimmer 203-1 is adjusted to allow world light 232 impinging on first dimmer 203-1 to completely or substantially pass through first dimmer 203-1, e.g., first dimmer 203-1 is turned off. Also during the third time interval, second dimmer 203-2 is adjusted to allow world light 232 impinging on second dimmer 203-2 to completely or substantially pass through second dimmer 203-2, e.g., second dimmer 203-2 is turned off. In some embodiments, the order of the time intervals may be, for example, the first time interval, the second time interval, and the third time interval. This order may then repeat. In some embodiments, the order of the time intervals may be, for example, the first time interval, the third time interval, the second time interval, and the third time interval. This order may then repeat. In some embodiments, any one of the time intervals may repeat consecutively. One of ordinary skill in the art will appreciate the time intervals may occur in any manner desired.

Figure 6A:
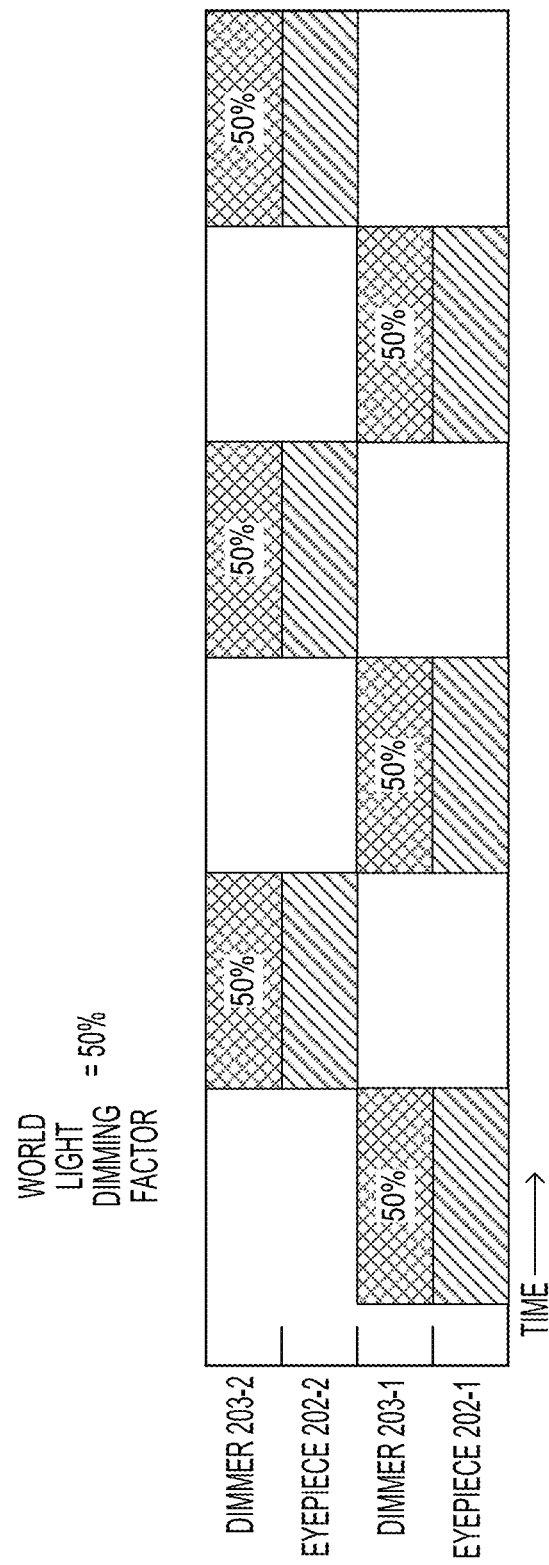
FIG. 6A illustrates a timing diagram for an AR device.

FIG. 6A illustrates a timing diagram for controlling an optical device, such as AR device 200, according to some embodiments. In the illustrated embodiment, AR device 200 cycles between operating within a first time interval in which first eyepiece 202-1 is activated, second eyepiece 202-2 is not activated, first dimmer 203-1 is turned on, and second dimmer 203-2 is turned off, and operating within a second time interval in which first eyepiece 202-1 is not activated, second eyepiece 202-2 is activated, first dimmer 203-1 is turned off, and second dimmer 203-2 is turned on. In the illustrated embodiment, first time intervals and second time intervals are nonconcurrent. When turned on, both of first dimmer 203-1 and second dimmer 203-2 are adjusted to reduce light passing therethrough by, for example, 50%. Accordingly, world light 232 is reduced on average by 50% while AR device 200 operates in accordance with the illustrated timing diagram. One of ordinary skill in the art will appreciate that first dimmer 203-1 and second dimmer 203-2 may be adjusted to reduce light passing therethrough by different percentages based on desired system outputs (e.g., amount of artifact image light to be mitigated, amount of world light to be mitigated, and the like).

Figure 6B:
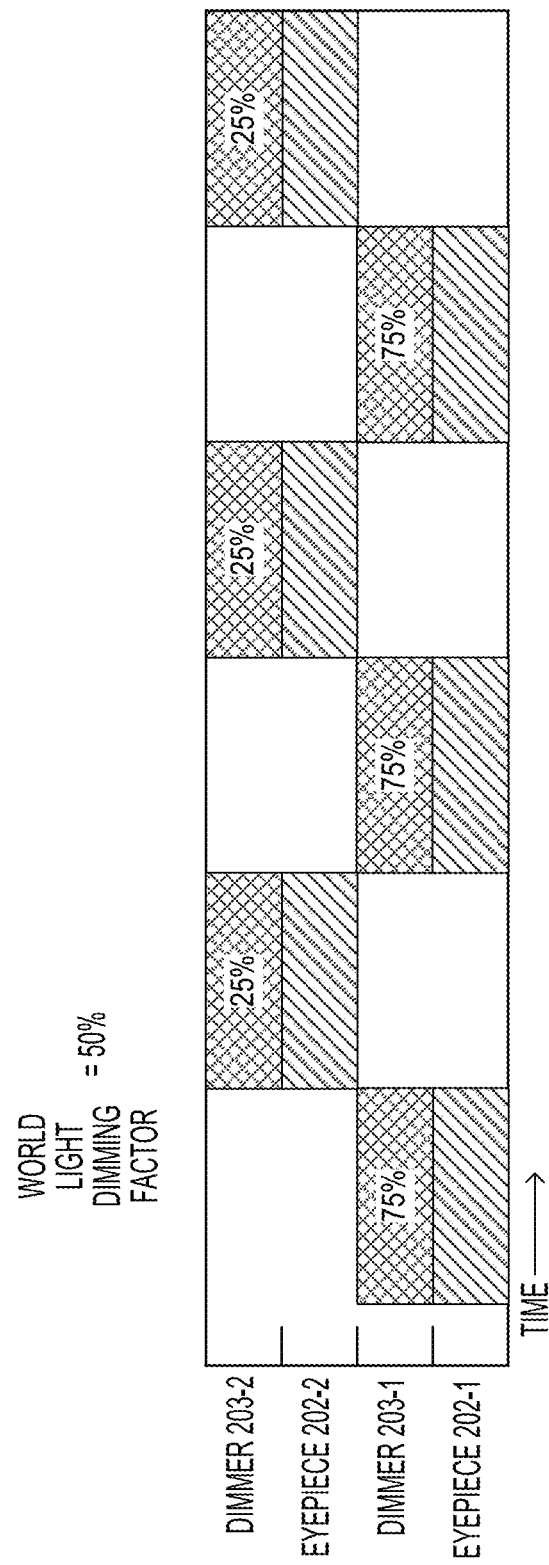
FIG. 6B illustrates a timing diagram for an AR device.

FIG. 6B illustrates a timing diagram for controlling an optical device, such as AR device 200, according to some embodiments. In the illustrated embodiment, AR device 200 cycles between operating within a first time interval in which first eyepiece 202-1 is activated, second eyepiece 202-2 is not activated, first dimmer 203-1 is turned on, and second dimmer 203-2 is turned off, and operating within a second time interval in which first eyepiece 202-1 is not activated, second eyepiece 202-2 is activated, first dimmer 203-1 is turned off, and second dimmer 203-2 is turned on. In the illustrated embodiment, first time intervals and second time intervals are nonconcurrent. When turned on, first dimmer 203-1 is adjusted to reduce light passing therethrough by 75% and second dimmer 203-2 is adjusted to reduce light passing therethrough by 25%. Accordingly, world light 232 is reduced on average by 50% while AR device 200 operates in accordance with the illustrated timing diagram. One of ordinary skill in the art will appreciate that first dimmer 203-1 and second dimmer 203-2 may be adjusted to reduce light passing therethrough by different percentages based on desired system outputs (e.g., amount of artifact image light to be mitigated, amount of world light to be mitigated, and the like).

Figure 6C:
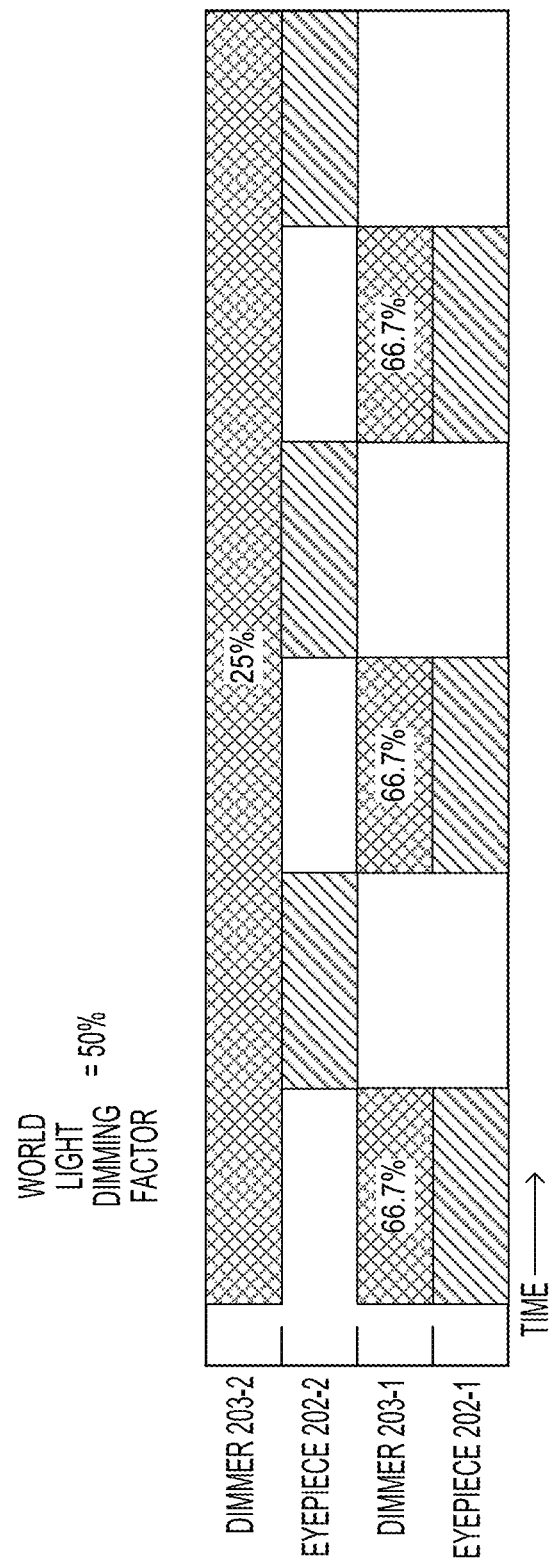
FIG. 6C illustrates a timing diagram for an AR device.

FIG. 6C illustrates a timing diagram for controlling an optical device, such as AR device 200, according to some embodiments. In the illustrated embodiment, AR device 200 cycles between operating within a first time interval in which first eyepiece 202-1 is activated, second eyepiece 202-2 is not activated, first dimmer 203-1 is turned on, and second dimmer 203-2 is turned on, and operating within a second time interval in which first eyepiece 202-1 is not activated, second eyepiece 202-2 is activated, first dimmer 203-1 is turned off, and second dimmer 203-2 is turned on. When turned on, first dimmer 203-1 is adjusted to reduce light passing therethrough by 66.7% and second dimmer 203-2 is adjusted to reduce light passing therethrough by 25%. Accordingly, world light 232 is reduced on average by 50% while AR device 200 operates in accordance with the illustrated timing diagram.

Figure 6D:
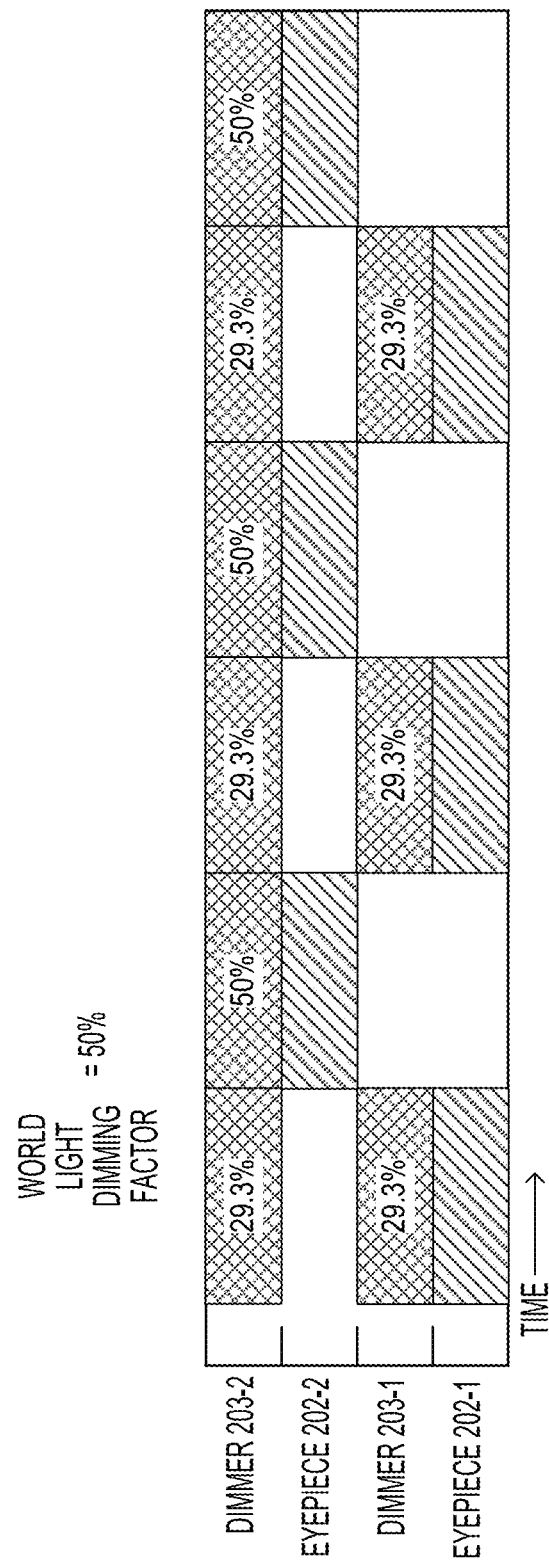
FIG. 6D illustrates a timing diagram for an AR device.

FIG. 6D illustrates a timing diagram for controlling an optical device, such as AR device 200, according to some embodiments. In the illustrated embodiment, AR device 200 cycles between operating within a first time interval in which first eyepiece 202-1 is activated, second eyepiece 202-2 is not activated, first dimmer 203-1 is turned on, and second dimmer 203-2 is turned on, and operating within a second time interval in which first eyepiece 202-1 is not activated, second eyepiece 202-2 is activated, first dimmer 203-1 is turned off, and second dimmer 203-2 is turned on. When turned on, first dimmer 203-1 is adjusted to reduce light passing therethrough by 29.3% and second dimmer 203-2 is adjusted to reduce light passing therethrough by either 29.3% (during the first time interval) or 50% (during the second time interval). Accordingly, world light 232 is reduced on average by 50% while AR device 200 operates in accordance with the illustrated timing diagram. As demonstrated by FIGS. 6A-6D, AR device 200 is able to achieve a similar world light dimming factor while varying the dimming levels of dimmers 203-1, 203-2. One of ordinary skill in the art will appreciate that first dimmer 203-1 and second dimmer 203-2 may be adjusted to reduce light passing therethrough by different percentages based on desired system outputs (e.g., amount of artifact image light to be mitigated, amount of world light to be mitigated, and the like).

Figure 7A:
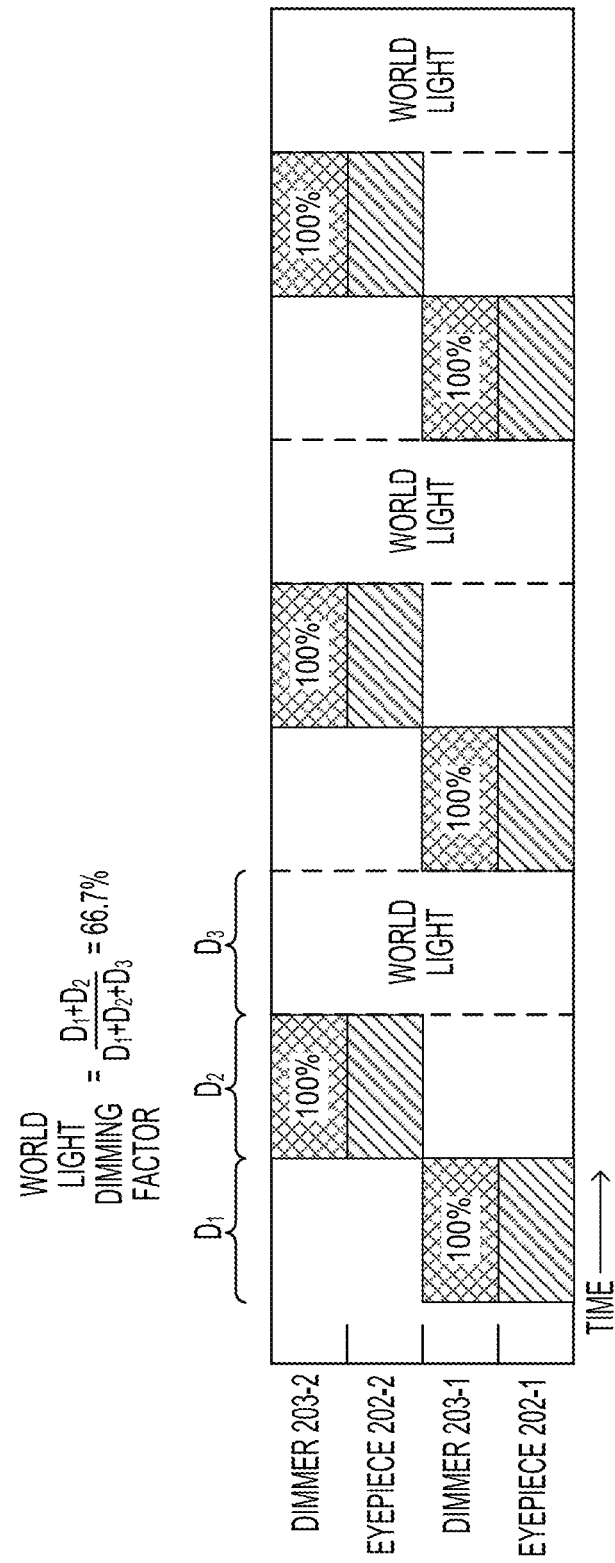
FIG. 7A illustrates a timing diagram for an AR device.

FIG. 7A illustrates a timing diagram for controlling an optical device, such as AR device 200, according to some embodiments. In the illustrated embodiment, AR device 200 cycles between operating within a first time interval in which first eyepiece 202-1 is activated, second eyepiece 202-2 is not activated, first dimmer 203-1 is turned on, and second dimmer 203-2 is turned off, operating within a second time interval in which first eyepiece 202-1 is not activated, second eyepiece 202-2 is activated, first dimmer 203-1 is turned off, and second dimmer 203-2 is turned on, and operating within a third time interval in which first eyepiece 202-1 is not activated, second eyepiece 202-2 is not activated, first dimmer 203-1 is turned off, and second dimmer 203-2 is turned off. In the illustrated embodiment, first time intervals, second time intervals, and third time intervals are nonconcurrent. When turned on, first dimmer 203-1 is adjusted to completely or substantially block light passing therethrough and second dimmer 203-2 is adjusted to completely or substantially block light passing therethrough. When first time intervals, second time intervals, and third time intervals have equal durations (e.g., $D_1=D_2=D_3$), world light 232 is reduced on average by 66.7% while AR device 200 operates in accordance with the illustrated timing diagram. One of ordinary skill in the art will appreciate the first time intervals, second time intervals, and third time intervals may be different from that shown in the illustrated embodiment (e.g., not equal).

Figure 7B:
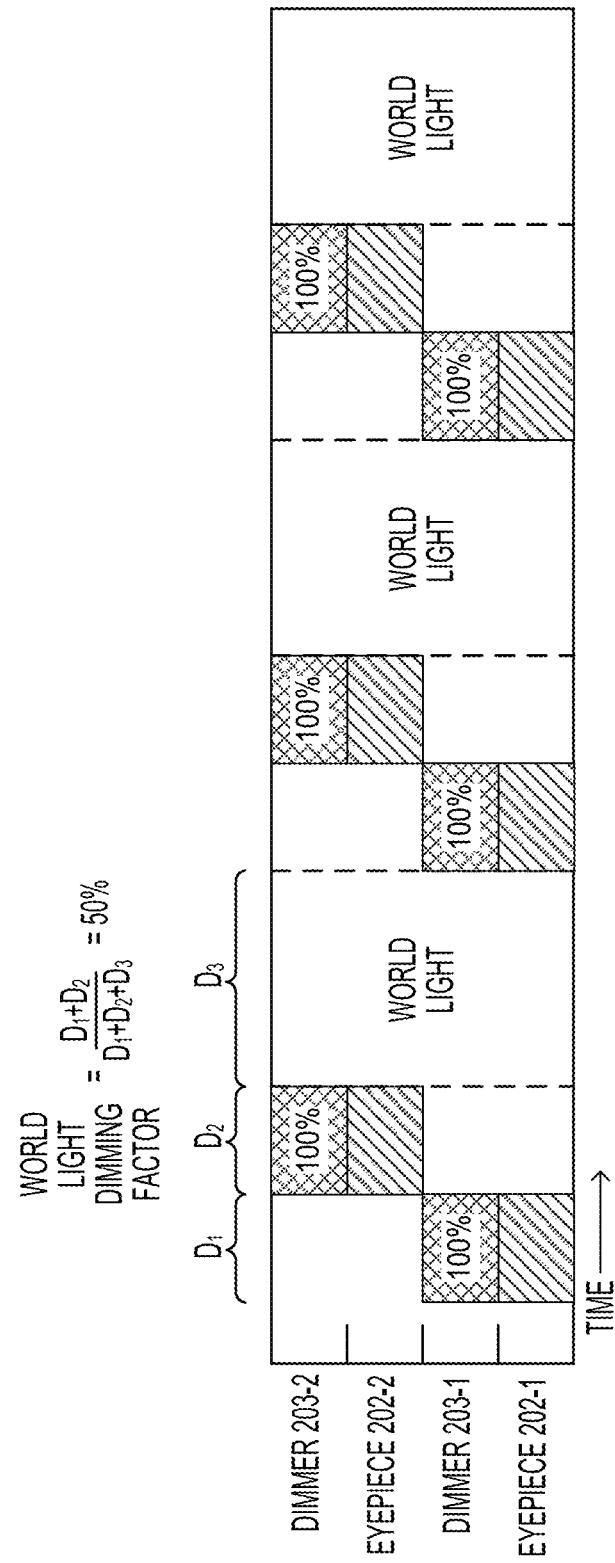
FIG. 7B illustrates a timing diagram for an AR device.

FIG. 7B illustrates a timing diagram for controlling an optical device, such as AR device 200, according to some embodiments. In the illustrated embodiment, AR device 200 cycles between operating within a first time interval in which first eyepiece 202-1 is activated, second eyepiece 202-2 is not activated, first dimmer 203-1 is turned on, and second dimmer 203-2 is turned off, operating within a second time interval in which first eyepiece 202-1 is not activated, second eyepiece 202-2 is activated, first dimmer 203-1 is turned off, and second dimmer 203-2 is turned on, and operating within a third time interval in which first eyepiece 202-1 is not activated, second eyepiece 202-2 is not activated, first dimmer 203-1 is turned off, and second dimmer 203-2 is turned off. In the illustrated embodiment, first time intervals, second time intervals, and third time intervals are nonconcurrent. When turned on, first dimmer 203-1 is adjusted to completely or substantially block light passing therethrough and second dimmer 203-2 is adjusted to completely or substantially block light passing therethrough. When third time intervals have double the durations of first time intervals and second time intervals (e.g., $D_3=2D_1=2D_2$), world light 232 is reduced on average by 50% while AR device 200 operates in accordance with the illustrated timing diagram. One of ordinary skill in the art will appreciate the first time intervals, second time intervals, and third time intervals may be different from that shown in the illustrated embodiment (e.g., third time interval may be greater than or less than double the durations of first time intervals and second time intervals).

Figure 7C:
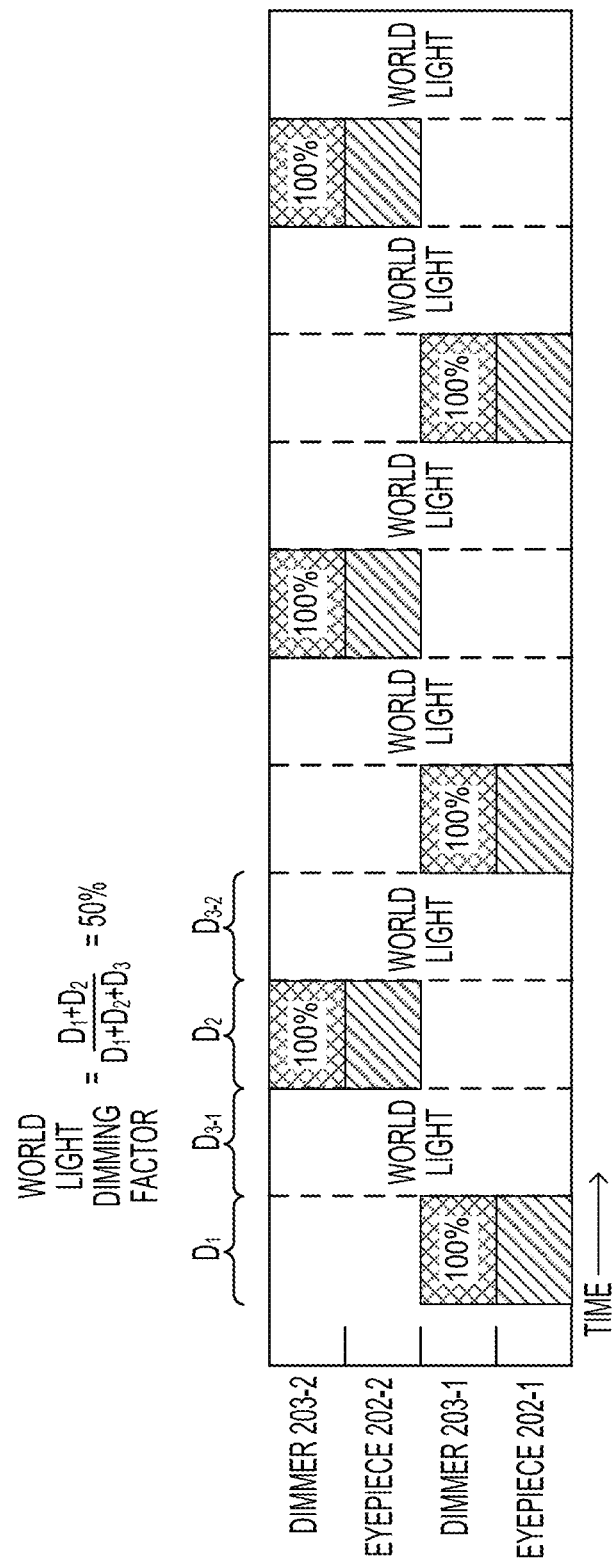
FIG. 7C illustrates a timing diagram for an AR device.

FIG. 7C illustrates a timing diagram for controlling an optical device, such as AR device 200, according to some embodiments. In the illustrated embodiment, AR device 200 cycles between operating within a first time interval in which first eyepiece 202-1 is activated, second eyepiece 202-2 is not activated, first dimmer 203-1 is turned on, and second dimmer 203-2 is turned off, operating within a third time interval in which first eyepiece 202-1 is not activated, second eyepiece 202-2 is not activated, first dimmer 203-1 is turned off, and second dimmer 203-2 is turned off, operating within a second time interval in which first eyepiece 202-1 is not activated, second eyepiece 202-2 is activated, first dimmer 203-1 is turned off, and second dimmer 203-2 is turned on, and again operating within the third time interval. In the illustrated embodiment, first time intervals, second time intervals, and third time intervals are nonconcurrent. When turned on, first dimmer 203-1 is adjusted to completely or substantially block light passing therethrough and second dimmer 203-2 is adjusted to completely or substantially block light passing therethrough. When third time intervals have double the durations of first time intervals and second time intervals (e.g., $D_3=2D_1=2D_2$), world light 232 is reduced on average by 50% while AR device 200 operates in accordance with the illustrated timing diagram. One of ordinary skill in the art will appreciate the first time intervals, second time intervals, and third time intervals may be different from that shown in the illustrated embodiment.

Figure 8:
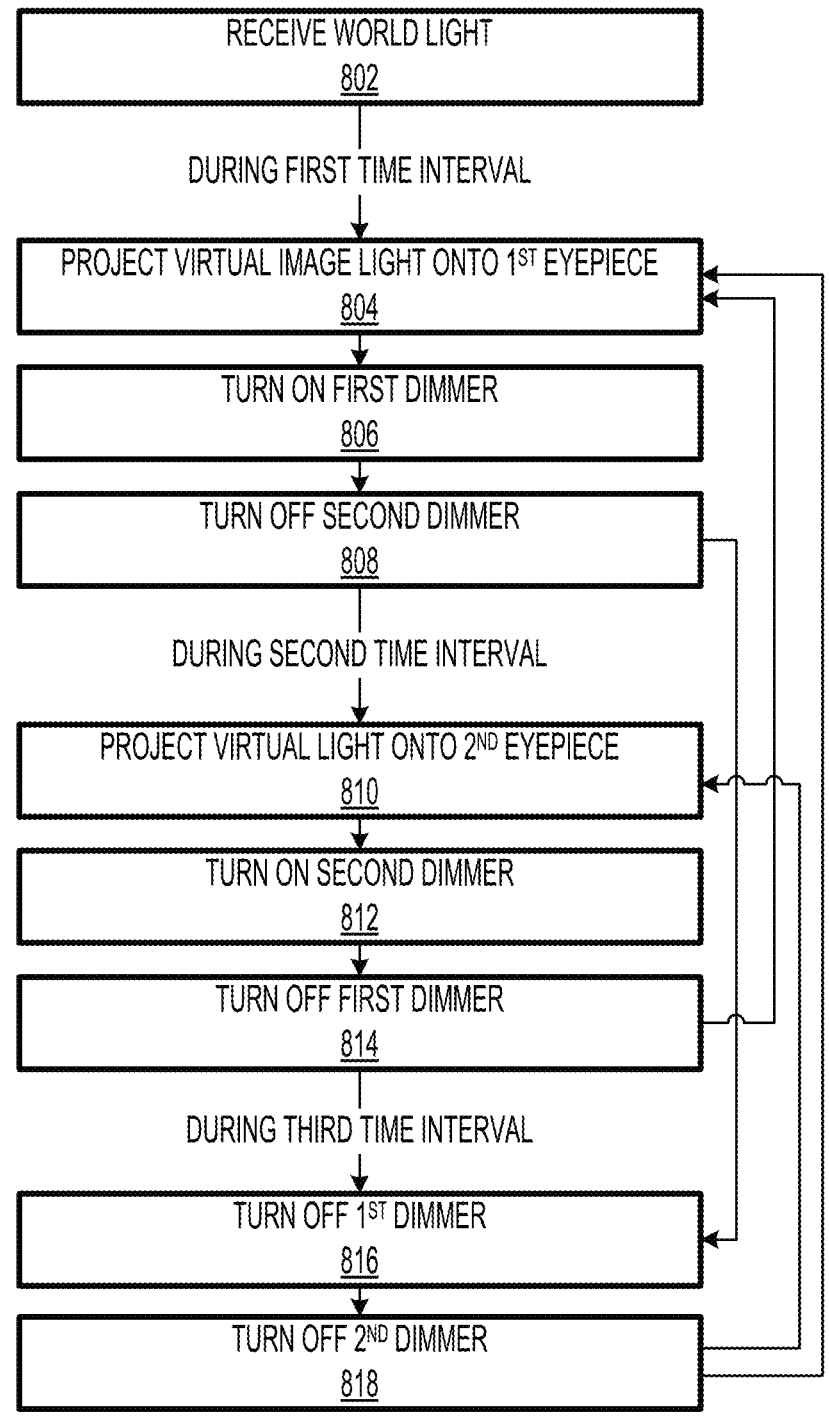
FIG. 8 illustrates a method of operating an optical system.

FIG. 8 illustrates a method 800 of operating an optical system, such as AR device 200, according to some embodiments. One or more steps of method 800 may be performed in a different order than the illustrated embodiment, and one or more steps of method 800 may be omitted during performance of method 800. One or more steps of method 800 may be implemented, caused, or initiated by one or more components of AR devices 200, 300. For example, one or more steps of method 800 may be initiated by processing module 350, which may send control signals (e.g., dimmer control signals 319) to dimmers 303 and/or projectors 314.

At step 802, world light 232 is received at the optical system. The optical system may be characterized by a world side and a user side opposing the world side. World light 232 may be received from the world side of the optical system such that a source of world light 232 may be closest to the world side of the optical system and such that world light 232 may reach the world side of the optical system prior to reaching the user side of the optical system.

During a first time interval, one or more of steps 804, 806, and 808 may be performed. At step 804, virtual image light 223 is projected onto first eyepiece 202-1 (e.g., onto one or more waveguides of first eyepiece 202-1). In some embodiments, projecting virtual image light 223 onto first eyepiece 202-1 causes a portion of virtual image light 223 to propagate toward the user side and another portion of virtual image light 223 (referred to as artifact image light 212) to propagate toward the world side, as illustrated in FIGS. 2B, 4B, 4C, and 5A.

At step 806, first dimmer 203-1 is adjusted to reduce an intensity of artifact image light 212 impinging on first dimmer 203-1 and/or an intensity of world light 232 impinging on first dimmer 203-1, as illustrated in FIGS. 4C and 5A. At step 808, second dimmer 203-2 is adjusted to allow light (e.g., world light 232) impinging on second dimmer 203-2 to substantially pass through second dimmer 203-2, as illustrated in FIG. 4C. After the first time interval, method 800 may proceed to the second time interval or the third time interval.

During a second time interval, one or more of steps 810, 812, and 814 may be performed. At step 810, virtual image light 223 is projected onto second eyepiece 202-2 (e.g., onto one or more waveguides of second eyepiece 202-2). In some embodiments, projecting virtual image light 223 onto second eyepiece 202-2 causes a portion of virtual image light 223 to propagate toward the user side and another portion of virtual image light 223 (referred to as artifact image light 212) to propagate toward the world side, as illustrated in FIGS. 2B, 4D, and 5B.

At step 812, second dimmer 203-2 is adjusted to reduce an intensity of artifact image light 212 impinging on second dimmer 203-2 and/or an intensity of world light 232 impinging on second dimmer 203-2, as illustrated in FIGS. 4D and 5B. At step 814, first dimmer 203-1 is adjusted to allow virtual image light 223 and/or world light 232 impinging on first dimmer 203-1 to substantially pass through first dimmer 203-1, as illustrated in FIG. 4D. After the second time interval, method 800 may proceed to the first time interval or the third time interval.

During a third time interval, one or more of steps 816 and 818 are performed. At step 816, first dimmer 203-1 is adjusted to allow world light 232 impinging on first dimmer 203-1 to substantially pass through first dimmer 203-1, as illustrated in FIG. 5C. At step 818, second dimmer 203-2 is adjusted to allow world light 232 impinging on second dimmer 203-2 to substantially pass through second dimmer 203-2, as illustrated in FIG. 5C. Additionally, during the third time interval, projector 214 may be turned off such that virtual image light 223 is not projected onto either of eyepieces 202-1, 202-2, as illustrated in FIG. 5C. After the third time interval, method 800 may proceed to the first time interval or the second time interval.

In some embodiments, method 800 includes the additional steps of (1) receiving, from ambient light sensor 234, a brightness value of world light 232 and (2) determining the durations of one or more of the first time interval, second time interval, and third time interval, and/or the switching frequency between the first time interval, the second time interval, and the third time interval based on the brightness value. For example, in response to receiving a high brightness value of world light 232 indicating bright, outdoor conditions, the duration of the first time interval may be increased, the duration of the second time interval may be increased, and/or the duration of the third time interval may be decreased or eliminated. Additionally or alternatively, the dimming levels of the dimmers may be increased. Conversely, in response to receiving a low brightness value of world light 232 indicating low light, indoor or night conditions, the duration of the first time interval may be decreased, the duration of the second time interval may be decreased, and/or the duration of the third time interval may be increased. Additionally or alternatively, the dimming levels of the dimmers may be decreased.

Figure 9:
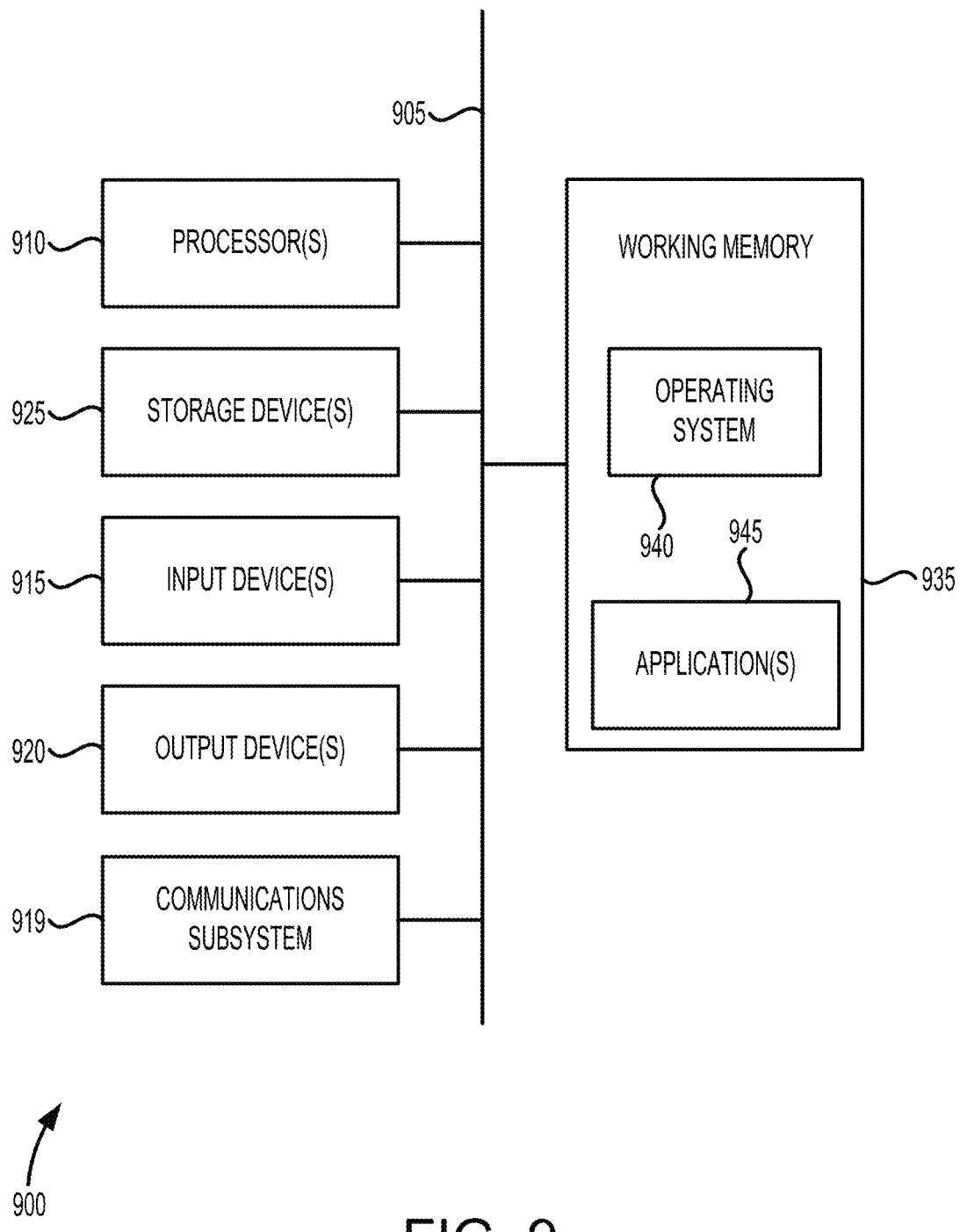
FIG. 9 illustrates a simplified computer system.

FIG. 9 illustrates a simplified computer system 900 according to an embodiment described herein. Computer system 900 as illustrated in FIG. 9 may be incorporated into devices such as AR devices 200, 300 as described herein. FIG. 9 provides a schematic illustration of one embodiment of computer system 900 that can perform some or all of the steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

Computer system 900 is shown comprising hardware elements that can be electrically coupled via a bus 905, or may otherwise be in communication, as appropriate. The hardware elements may include one or more processors 910, including without limitation one or more general-purpose processors and/or one or more special-purpose processors such as digital signal processing chips, graphics acceleration processors, and/or the like; one or more input devices 915, which can include without limitation a mouse, a keyboard, a camera, and/or the like; and one or more output devices 920, which can include without limitation a display device, a printer, and/or the like.

Computer system 900 may further include and/or be in communication with one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 900 might also include a communications subsystem 919, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. Communications subsystem 919 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via communications subsystem 919. In other embodiments, a portable electronic device, e.g. the first electronic device, may be incorporated into computer system 900, e.g., an electronic device as an input device 915. In some embodiments, computer system 900 will further comprise a working memory 935, which can include a RAM or ROM device, as described above.

Computer system 900 also can include software elements, shown as being currently located within working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as storage device(s) 925 described above. In some cases, the storage medium might be incorporated within a computer system, such as computer system 900. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 900 and/or might take the form of source and/or installable code, which, upon compilation and/or installation on computer system 900 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 900 to perform methods in accordance with various embodiments of the technology. According to a set of embodiments, some or all of the procedures of such methods are performed by computer system 900 in response to processor 910 executing one or more sequences of one or more instructions, which might be incorporated into operating system 940 and/or other code, such as an application program 945, contained in working memory 935. Such instructions may be read into working memory 935 from another computer-readable medium, such as one or more of storage device(s)

925. Merely by way of example, execution of the sequences of instructions contained in working memory 935 might cause processor(s) 910 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as storage device(s) 925. Volatile media include, without limitation, dynamic memory, such as working memory 935.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 900.

Communications subsystem 919 and/or components thereof generally will receive signals, and bus 905 then might carry the signals and/or the data, instructions, etc. carried by the signals to working memory 935, from which processor(s) 910 retrieves and executes the instructions. The instructions received by working memory 935 may optionally be stored on a non-transitory storage device 925 either before or after execution by processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating an optical system, the method comprising:
   receiving light associated with a world object at the optical system, wherein the optical system is characterized by a world side and a user side opposing the world side, and wherein the light associated with the world object is received from the world side; and
   during one or more first time intervals:
      projecting light associated with a first virtual image onto a first eyepiece of the optical system, causing a portion of the light associated with the first virtual image to propagate toward the user side and light associated with a first artifact image to propagate toward the world side; and
      adjusting a first dimmer of the optical system positioned between the world side and the first eyepiece to reduce an intensity of the light associated with the first artifact image impinging on the first dimmer and an intensity of the light associated with the world object impinging on the first dimmer.

2. The method of claim 1, further comprising:
during one or more second time intervals:
projecting light associated with a second virtual image onto a second eyepiece of the optical system positioned between the world side and the first dimmer, causing a portion of the light associated with the second virtual image to propagate toward the user side and light associated with a second artifact image to propagate toward the world side; and
adjusting the first dimmer to allow the light associated with the second virtual image impinging on the first dimmer to substantially pass through the first dimmer.

3. The method of claim 2, further comprising:
during the one or more first time intervals:
adjusting a second dimmer of the optical system positioned between the world side and the second eyepiece to allow the light associated with the world object impinging on the second dimmer to substantially pass through the second dimmer; and
during the one or more second time intervals:
adjusting the second dimmer to reduce an intensity of the light associated with the second artifact image impinging on the second dimmer and an intensity of the light associated with the world object impinging on the second dimmer.

4. The method of claim 3, wherein the one or more first time intervals at least partially overlap with the one or more second time intervals.

5. The method of claim 3, wherein the one or more first time intervals are nonconcurrent with the one or more second time intervals.

6. The method of claim 3, further comprising:
during one or more third time intervals:
adjusting the first dimmer to allow the light associated with the world object impinging on the first dimmer to substantially pass through the first dimmer; and
adjusting the second dimmer to allow the light associated with the world object impinging on the second dimmer to substantially pass through the second dimmer.

7. The method of claim 6, wherein the one or more third time intervals are nonconcurrent with both the one or more first time intervals and the one or more second time intervals.

8. The method of claim 1, further comprising:
receiving, from an ambient light sensor, a brightness value of the light associated with the world object; and
determining a duration or a frequency of the one or more first time intervals based on the brightness value.

9. An optical system configured to receive light associated with a world object, the optical system comprising:
a first eyepiece;
a projector configured to project light associated with a first virtual image onto the first eyepiece during one or more first time intervals, causing a portion of the light associated with the first virtual image to propagate toward a user side and light associated with a first artifact image to propagate toward a world side, wherein the optical system is characterized by the world side and the user side opposing the world side, and wherein the light associated with the world object is received from the world side; and
a first dimmer positioned between the world side and the first eyepiece, wherein the first dimmer is configured to be adjusted to reduce an intensity of the light associated with the first artifact image impinging on the first dimmer and an intensity of the light associated with the world object impinging on the first dimmer.

10. The optical system of claim 9, further comprising:
a second eyepiece positioned between the world side and the first dimmer, wherein the projector is configured to project light associated with a second virtual image onto the second eyepiece during one or more second time intervals, causing the light associated with the second virtual image to propagate toward the user side and light associated with a second artifact image to propagate toward the world side;
wherein the first dimmer is configured to allow the light associated with the second virtual image impinging on the first dimmer to substantially pass through the first dimmer during the one or more second time intervals.

11. The optical system of claim 10, further comprising:
a second dimmer positioned between the world side and the second eyepiece, wherein the second dimmer is configured to be adjusted to allow the light associated with the world object impinging on the second dimmer to substantially pass through the second dimmer during the one or more first time intervals;
wherein the second dimmer is configured to reduce an intensity of the light associated with the second artifact image impinging on the second dimmer and an intensity of the light associated with the world object impinging on the second dimmer during the one or more second time intervals.

12. The optical system of claim 11, wherein the one or more first time intervals at least partially overlap with the one or more second time intervals.

13. The optical system of claim 11, wherein the one or more first time intervals are nonconcurrent with the one or more second time intervals.

14. The optical system of claim 11, wherein:
the first dimmer is configured to be adjusted to allow the light associated with the world object impinging on the first dimmer to substantially pass through the first dimmer during one or more third time intervals; and
the second dimmer is configured to be adjusted to allow the light associated with the world object impinging on the second dimmer to substantially pass through the second dimmer during the one or more third time intervals.

15. The optical system of claim 14, wherein the one or more third time intervals are nonconcurrent with both the one or more first time intervals and the one or more second time intervals.

16. The optical system of claim 9, further comprising:
an ambient light sensor configured to detect a brightness value of the light associated with the world object, wherein a duration or a frequency of the one or more first time intervals is based on the brightness value.

17. A non-transitory computer-readable medium comprising instructions that, when executed by a processor, cause the processor to perform operations including:
receiving light associated with a world object at an optical system; and
during one or more first time intervals:
projecting light associated with a first virtual image onto a first eyepiece of the optical system, causing a portion of the light associated with the first virtual image to propagate toward a user side and light associated with a first artifact image to propagate toward a world side; and adjusting a first dimmer of the optical system positioned between the world side and the first eyepiece to reduce an intensity of the light associated with the first artifact image impinging on the first dimmer and an intensity of the light associated with the world object impinging on the first dimmer.

18. The non-transitory computer-readable medium of claim 17, wherein the operations further comprise:

during one or more second time intervals:

projecting light associated with a second virtual image onto a second eyepiece of the optical system positioned between the world side and the first dimmer, causing a portion of the light associated with the second virtual image to propagate toward the user side and light associated with a second artifact image to propagate toward the world side; and adjusting the first dimmer to allow the light associated with the second virtual image impinging on the first dimmer to substantially pass through the first dimmer.

19. The non-transitory computer-readable medium of claim 18, wherein the operations further comprise:

during the one or more first time intervals:

adjusting a second dimmer of the optical system positioned between the world side and the second eyepiece to allow world light impinging on the second dimmer to substantially pass through the second dimmer; and during the one or more second time intervals:

adjusting the second dimmer to reduce an intensity of the light associated with the second artifact image impinging on the second dimmer and an intensity of the world light impinging on the second dimmer.

20. The non-transitory computer-readable medium of claim 19, wherein the one or more first time intervals at least partially overlap with the one or more second time intervals.

* * * * *